(12) United States Patent
Barth et al.

(10) Patent No.: US 8,787,400 B1
(45) Date of Patent: Jul. 22, 2014

(54) WEIGHTED EQUAL-COST MULTIPATH

(75) Inventors: Colby Barth, Collegeville, PA (US);
Kireeti Kompella, Los Altos, CA (US);
David Ward, Los Gatos, CA (US); Joel Obstfeld, Bushey (GB); Hannes Gredler, Pillberg (AT); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 127 days.

(21) Appl. No.: 13/536,669

(22) Filed: Jun. 28, 2012

Related U.S. Application Data

(60) Provisional application No. 61/638,363, filed on Apr. 25, 2012.

(51) Int. Cl.
*H04L 12/56* (2006.01)

(52) U.S. Cl.
USPC .......................................................... 370/419

(58) Field of Classification Search
CPC ... H04L 43/0882; H04L 45/00; H04L 45/123; H04L 45/50; H04L 45/302; H04L 47/125; H04L 41/083; H04L 41/12; H04L 41/5003; H04L 41/5025; H04L 45/12; H04L 45/122; H04L 45/20; H04L 47/12
USPC ........................... 370/254–350; 709/201–213
See application file for complete search history.

(56) References Cited

U.S. PATENT DOCUMENTS

| | | | |
|---|---|---|---|
| 5,878,029 | A | 3/1999 | Hasegawa et al. |
| 6,363,319 | B1 | 3/2002 | Hsu |
| 6,538,416 | B1 | 3/2003 | Hahne et al. |
| 6,765,921 | B1 | 7/2004 | Stacey et al. |
| 6,831,895 | B1 | 12/2004 | Ji et al. |
| 6,956,821 | B2 | 10/2005 | Szviatovszki et al. |
| 7,006,499 | B2 | 2/2006 | Tingle et al. |
| 7,031,312 | B1 | 4/2006 | Jayakumar et al. |
| 7,039,706 | B1 | 5/2006 | Parker et al. |
| 7,046,669 | B1 | 5/2006 | Mauger et al. |
| 7,065,084 | B2 | 6/2006 | Seo |
| 7,082,102 | B1 | 7/2006 | Wright |
| 7,164,679 | B2 | 1/2007 | Kotha et al. |

(Continued)

OTHER PUBLICATIONS

Office Action from U.S. Appl. No. 13/536,487, dated Jan. 10, 2014, 53 pp.

(Continued)

*Primary Examiner* — Ayaz Sheikh
*Assistant Examiner* — Debebe Asefa
(74) *Attorney, Agent, or Firm* — Shumaker & Sieffert, P.A.

(57) ABSTRACT

Routers balance network traffic among multiple paths through a network according to an amount of bandwidth that can be sent on an outgoing interface computed for each of the paths. For example, a router receives a link bandwidth for network links that are positioned between the first router and a second router of the network, and selects a plurality of forwarding paths from the first router to the second router. Upon determining that one of the network links is shared by multiple of the plurality of forwarding paths, the router computes a path bandwidth for each of the plurality of outgoing interfaces so as to account for splitting of link bandwidth of the shared network link across the multiple forwarding paths that share the network link. The router assigns packet flows to the forwarding paths based at least on the computed amount of bandwidth for each of the outgoing interfaces.

26 Claims, 10 Drawing Sheets

(56) References Cited

U.S. PATENT DOCUMENTS

| | | | |
|---|---|---|---|
| 7,184,434 B2 | 2/2007 | Ganti et al. | |
| 7,317,731 B2 | 1/2008 | Seddigh et al. | |
| 7,324,453 B2 | 1/2008 | Wu et al. | |
| 7,336,617 B1 | 2/2008 | Liu | |
| 7,336,648 B1 | 2/2008 | Sasagawa | |
| 7,369,571 B2 | 5/2008 | Choudhury et al. | |
| 7,418,493 B1 | 8/2008 | Charny et al. | |
| 7,489,695 B1 | 2/2009 | Ayyangar | |
| 7,539,210 B2 | 5/2009 | Iovanna et al. | |
| 7,558,199 B1 | 7/2009 | Minei et al. | |
| 7,567,512 B1 | 7/2009 | Minei et al. | |
| 7,606,235 B1 | 10/2009 | Ayyangar et al. | |
| 7,839,850 B2* | 11/2010 | Kompella | 370/390 |
| 7,889,652 B1* | 2/2011 | Minei et al. | 370/230 |
| 8,094,555 B2 | 1/2012 | Ward et al. | |
| 8,218,553 B2 | 7/2012 | Kompella | |
| 2003/0028670 A1 | 2/2003 | Lee et al. | |
| 2003/0028818 A1 | 2/2003 | Fujita | |
| 2003/0103510 A1 | 6/2003 | Svanberg et al. | |
| 2003/0108051 A1 | 6/2003 | Bryden et al. | |
| 2003/0117950 A1 | 6/2003 | Huang | |
| 2003/0137971 A1 | 7/2003 | Gibson et al. | |
| 2003/0185217 A1 | 10/2003 | Ganti et al. | |
| 2003/0210705 A1 | 11/2003 | Seddigh et al. | |
| 2004/0004955 A1 | 1/2004 | Lewis | |
| 2004/0010617 A1 | 1/2004 | Akahane et al. | |
| 2004/0042398 A1 | 3/2004 | Peleg et al. | |
| 2004/0088965 A1 | 5/2004 | Burchert | |
| 2005/0010685 A1 | 1/2005 | Ramnath et al. | |
| 2005/0013242 A1 | 1/2005 | Chen et al. | |
| 2005/0073958 A1* | 4/2005 | Atlas et al. | 370/238 |
| 2005/0125490 A1 | 6/2005 | Ramia | |
| 2005/0169270 A1 | 8/2005 | Mutou et al. | |
| 2005/0169313 A1 | 8/2005 | Okamura et al. | |
| 2005/0243833 A1 | 11/2005 | Choudhury et al. | |
| 2005/0265258 A1 | 12/2005 | Kodialam et al. | |
| 2006/0013232 A1 | 1/2006 | Xu et al. | |
| 2006/0018326 A1 | 1/2006 | Yucel | |
| 2006/0039364 A1 | 2/2006 | Wright | |
| 2006/0039391 A1 | 2/2006 | Vasseur et al. | |
| 2006/0126536 A1 | 6/2006 | Patel et al. | |
| 2006/0159009 A1 | 7/2006 | Kim et al. | |
| 2006/0182035 A1 | 8/2006 | Vasseur | |
| 2006/0182119 A1 | 8/2006 | Li et al. | |
| 2006/0209785 A1 | 9/2006 | Iovanna et al. | |
| 2006/0233137 A1 | 10/2006 | Dantu et al. | |
| 2007/0133406 A1 | 6/2007 | Vasseur | |
| 2007/0177505 A1 | 8/2007 | Charrua et al. | |
| 2007/0268821 A1 | 11/2007 | Levit et al. | |
| 2007/0268909 A1 | 11/2007 | Chen et al. | |
| 2008/0019266 A1 | 1/2008 | Liu et al. | |
| 2008/0049776 A1 | 2/2008 | Wiley et al. | |
| 2008/0101239 A1 | 5/2008 | Goode | |
| 2008/0123532 A1 | 5/2008 | Ward et al. | |
| 2008/0144632 A1 | 6/2008 | Rabie et al. | |
| 2008/0168510 A1 | 7/2008 | Small et al. | |
| 2008/0175269 A1* | 7/2008 | Alvarez et al. | 370/468 |
| 2008/0239959 A1 | 10/2008 | Shepherd et al. | |
| 2008/0259936 A1 | 10/2008 | Hussain et al. | |
| 2009/0003200 A1 | 1/2009 | So | |
| 2009/0268605 A1 | 10/2009 | Campbell et al. | |
| 2011/0134769 A1 | 6/2011 | Lee et al. | |

OTHER PUBLICATIONS

Response to Office Action mailed Nov. 1, 2013, from U.S. Appl. No. 13/112,961, made on Feb. 3, 2014, 17 pp.
Request for Continued Examination and Responsive Amendment for U.S. Appl. No. 10/928,572, filed Mar. 3, 2009, 16 pp.
Office Action from U.S. Appl. No. 13/112,961, dated Mar. 1, 2013, 16 pp.
Response to Office Action mailed Mar. 1, 2013, from U.S. Appl. No. 13/112,961, made on Jul. 1, 2013, 18 pp.
Office Action from U.S. Appl. No. 13/112,961, dated Nov. 1, 2013, 17 pp.
Final Office Action from U.S. Appl. No. 13/112,961, dated Mar. 4, 2014, 18 pp.
Response to Office Action dated Jan. 10, 2014, from U.S. Appl. No. 13/536,487, dated Apr. 10, 2014, 21 pp.
D. Awduche et al., "RFC 3209—RSVP-TE: Extensions to RSVP for LSP Tunnels," Network Working Group, Dec. 2001, 47 pp.
RSVP-TE: Resource Reservation Protocol—Traffic Extension, Javvin Company, Feb. 14, 2005, 2 pp.
Quality of Service and Traffic Engineering Using Multiprotocol Label Switching; PowerPoint presentation, R. Jain—Ohio State University, Aug. 1999, 90 pp.
Kim et al., QoS-Guaranteed DiffServ-Aware-MPLS Traffic Engineering with Controlled Bandwidth Borrowing, Lecture Notes in Computer Science, 2004, 13 pp.
Davie et al., RFC 3035; MPLS Using LDP and ATM VC Switching; Jan. 2001, 18 pp.
A Solution for Managing Quality of Service in Internet Protocol Networks; M. Vapa Master's Thesis, University of Jyvaskyla, Dec. 14, 2000, 91 pp.
Advance Reservations of Bandwidth in Computer Networks; L.O. Burhard, 2004, Citeseer, 177 pp.
An MPLS-Based Quality of Service Architecture for Heterogeneous Networks; S. Raghavan, Nov. 12, 2001, 107 pp.
IP/MPLS based VPNs, Layer-3 vs Layer-2; Ahmed Abdelhalim, Foundry Networks, 2002, 16 pp.
QoS and Traffic Engineering; MPLS, DiffServ and Constraint Based Routing, Singh et al., May 2000, 31 pp.
Ayyangar et al., "Inter-region MPLS Traffic Engineering", Jun. 2003, Network Working Group Internet Draft, draft-ayyangar-inter-region-te-00.txt, 21 pp.
Ayyangar et al., "Label Switched Patch Stitching with Generalized Multiprotocol Label Switching Traffic Engineering (GMPLS TE)," RFC 5150, Feb. 2008, 18 pp.
Katz et al., "Traffic Engineering (TE) Extensions to OSPF Version 2," RFC 3630, Sep. 2003, 15 pp.
Kompella et al., "Link Building in MPLS Traffic Engineering (TE)," RFC 4201, Oct. 2005, 12 pp.
Kompella et al., "Label Switched Paths (LSP) Hierarchy with Generalized Multi-Protocol Label Switching (GMPLS) Traffic Engineering (TE)," RFC 4206, Oct. 2005, 15 pp.
Lang, "Link Management Protocol (LMP)," RFC 4204, Oct. 2005, 81 pp.
Minei et al., "Extensions for Differentiated Services-aware Traffic Engineered LSPs," draft-minei-diffserv-te-multi-class-02.txt, Jun. 2006, 11 pp.
Polk et al., "A Resource Reservation Protocol (RSVP) Extension for the Reduction of Bandwidth of a Reservation Flow," RFC 4495, May 2006, 22 pp.
Rosen et al., "Multiprotocol Label Switching Architecture," RFC 3031, Jan. 2001, 57 pp.
Shiomoto et al., "Procedures for Dynamically Signaled Hierarchical Label Switched Paths," draft-ietf-ccamp-lsp-hierarchy-bis-08.txt, Feb. 27, 2010, 30 pp.
Zamfir et al., "Component Link Recording and Resource Control for TE Link Bundles," draft-ietf-mpls-explicit-resource-control-bundle-07.txt, May 25, 2010, 13 pp.
Zimmermann, "OSI Reference Model—The ISO Model of Architecture for Open Systems Interconnection," IEEE Transactions on Communications, vol. 28, No. 4, Apr. 1980, pp. 425-432.
Giacalone et al. "OSPF Traffic Engineering (TE) Express Path," Network Working Group, Internet-Draft, Sep. 21, 2011, 15 pp.
Kompella et al. "The Use of Entropy Labels in MPLS Forwarding," Network Working Group, Internet-Draft, Oct. 31, 2011, 25 pp.
Kompella "Multi-path Label Switched Paths Signaled Using RSVP-TE," Network Working Group, Internet-Draft, Oct. 31, 2011, 19 pp.
Bryant et al. "Flow-Aware Transport of Pseudowires over an MPLS Packet Switched Network," Internet Engineering Task Force (IETF), RFC 6391, Nov. 2011, 19 pp.
Office Action from U.S. Appl. No. 10/928,572, dated May 14, 2008, 11 pp.
Response to Office Action dated May 14, 2008, from U.S. Appl. No. 10/928,572, filed Sep. 15, 2008, 14 pp.

(56) References Cited

OTHER PUBLICATIONS

Final Office Action from U.S. Appl. No. 10/928,572, dated Dec. 12, 2008, 14 pp.
Notice of Allowance for U.S. Appl. No. 10/928,572, dated Jun. 2, 2009, 4 pp.
Office Action from U.S. Appl. No. 12/508,375, dated Jun. 2, 2010, 10 pp.
Response to Office Action from U.S. Appl. No. 12/508,375, filed Aug. 18, 2010, 2 pp.
Notice of Allowance for U.S. Appl. No. 12/508,375, dated Oct. 7, 2010, 4 pp.
U.S. Appl. No. 13/112,961, filed May 20, 2011.
U.S. Appl. No. 13/536,487, filed Jun. 28, 2012.

\* cited by examiner

| TYPE 144 | LENGTH 146 | AVAILABLEBANDWIDTH 148 |

FIG. 5

WEIGHTED EQUAL-COST MULTIPATH

This application claims the benefit of U.S. Provisional Patent Application 61/638,363 filed Apr. 25, 2012, the entire content of which is incorporated herein by reference.

TECHNICAL FIELD

This disclosure relates to computer networks and, more particularly, to distributing traffic load within a network.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

Computer networks may have parallel data paths. For example, a network may have a number of interconnected intermediate devices that provide connectivity from an inbound edge router to an outbound edge router. In a conventional routed network, the inbound edge router makes routing decisions to forward traffic to the outbound edge router. Based on information within each packet and routing information learned by operation of routing protocols, the inbound edge router selects a neighboring "next hop" router and forwards the packet out on an outbound physical link coupling the router to the selected next hop router. For example, the inbound edge router may choose the lowest cost physical link when selecting the next hop. In some cases the inbound edge router attempts to load balance when forwarding packets to the next hop routers, i.e., the neighboring routers coupled to its outgoing physical links. As a result, some of the packets traveling between two locations may make use of one path, while other packets may make use of one or more alternate paths.

SUMMARY

In general, techniques are described for balancing network traffic among multiple paths of equal cost through a network. In one example, network routers determine available bandwidth for respective neighboring links of the routers and exchange available bandwidth information using extended routing protocol advertisements. The routers store the available bandwidth information for advertised links in a traffic engineering database (TED).

Using routing information obtained by operation of one or more routing protocols as well as by administrative configuration, a router using the techniques described may in some instances identify multiple optimal paths through the network that each present the same cost to a destination. The router forms an equal-cost multipath (ECMP) set composed of the multiple optimal paths and installs the next-hops for the paths of the ECMP set to the forwarding table.

In some examples, a single network link along the equal-cost forwarding paths may be shared by more than one of the equal-cost forwarding paths. That is, paths from different next-hop routers can overlap and need to share one or more common links downstream. In one aspect, upon determining that one of the network links is shared by multiple of the plurality of equal-cost forwarding paths, the computing router can compute the amount of bandwidth that can be sent on an outgoing interface to the next-hop routers so as to account for splitting of link bandwidth of the shared network link across the multiple equal-cost forwarding paths that share the network link.

In some examples, the router may subsequently compute a weight for each outgoing interface that is proportional to the computed amount of bandwidth for each outgoing interface. The router thereafter allocates and forwards, on a per-packet flow basis for example, network traffic to corresponding next-hops for the different equal-cost forwarding paths in proportion to the respective weights computed by the router for the outgoing interface.

The techniques of this disclosure may present one or more advantages. For example, applying the techniques to allocate network traffic among equal-cost forwarding paths of an ECMP set according to respective overall computed path bandwidths along the paths may increase the amount of network traffic carried by high path bandwidth paths relative to low path bandwidth paths. This may reduce a likelihood of congestion within the ECMP set and improve network throughput. The techniques of this disclosure can therefore allow for use of different network architectures, and may also reduce the need for simultaneous equal link upgrades. The weighted ECMP techniques described herein can be applied not only to Internet Protocol (IP) and Label Distribution Protocol (LDP) traffic, but also to Resource Reservation Protocol with Traffic Engineering extensions (RSVP-TE) traffic, including RSVP-TE multi-path traffic when sub-LSPs are signaled without bandwidth reservation.

In one example aspect, a method includes receiving, with a first router of a network, a link bandwidth for each of one or more network links of the network that are positioned between the first router and a second router of the network, identifying, with the first router, a plurality of equal-cost forwarding paths from the first router of the network to the second router of the network, and upon determining that one of the network links is shared by multiple of the plurality of equal-cost forwarding paths, computing an amount of bandwidth that can be sent on each of a plurality of outgoing interfaces of the first router for the plurality of equal-cost forwarding paths, wherein computing the amount of bandwidth comprises computing the amount of bandwidth to account for splitting of link bandwidth of the shared network link across the multiple equal-cost forwarding paths that share the network link. The method also includes selectively assigning, with the first router, packet flows to each of the plurality of outgoing interfaces based at least on the computed amount of bandwidth, receiving packets for the packet flows with the first router, and forwarding packets of each of the packets flows to the respective one of the plurality of outgoing interfaces to which the packet flow is assigned.

In another example aspect, a network device includes a control unit comprising one or more processors, and a routing protocol software of the control unit to receive a link bandwidth for each of one or more network links of a network that are positioned between the network device and a second network device of the network, wherein the routing protocol software is to execute a routing protocol to identify a plurality of equal-cost forwarding paths from the first router of the network to the second router of the network. The network device also includes a path weight calculator of the control unit to, upon determining that one of the network links is shared by multiple of the plurality of equal-cost forwarding paths, compute an amount of bandwidth that can be sent on each of a plurality of outgoing interfaces of the first router for the plurality of equal-cost forwarding paths, wherein computing the amount of bandwidth comprises computing the amount of bandwidth to account for splitting of link bandwidth of the shared network link across the multiple equal-cost forwarding paths that share the network link. The network device also includes a multipath forwarding component of the control unit to selectively assign packet flows to each of the plurality of outgoing interfaces of the network device based at least on the computed amount of bandwidth, and one or more interface cards to receive packets for the packet flows, wherein the multipath forwarding component forwards packets of each of the packets flows to the respective one of the plurality of outgoing interfaces to which the packet flow is assigned.

In another example aspect, a computer-readable storage medium includes instructions for causing a programmable processor to receive a link bandwidth for each of one or more network links of the network that are positioned between the first router and a second router of the network, identify a plurality of equal-cost forwarding paths from the first router of the network to the second router of the network, and upon determining that one of the network links is shared by multiple of the plurality of equal-cost forwarding paths, compute an amount of bandwidth that can be sent on each of a plurality of outgoing interfaces of the first router for the plurality of equal-cost forwarding paths, wherein computing the amount of bandwidth comprises computing the amount of bandwidth to account for splitting of link bandwidth of the shared network link across the multiple equal-cost forwarding paths that share the network link. The computer-readable storage medium also includes instructions to selectively assign packet flows to each of the plurality of outgoing interfaces based at least on the computed amount of bandwidth, receive packets for the packet flows with the first router, and forward packets of each of the packets flows to the respective one of the plurality of outgoing interfaces to which the packet flow is assigned.

The details of one or more aspects of this disclosure are set forth in the accompanying drawings and the description below. Other features, objects, and advantages will be apparent from the description and drawings, and from the claims.

BRIEF DESCRIPTION OF DRAWINGS

FIG. 5 is a block diagram illustrating an example encoding of the available bandwidth information described herein for a routing protocol.

DETAILED DESCRIPTION

Figure 1:
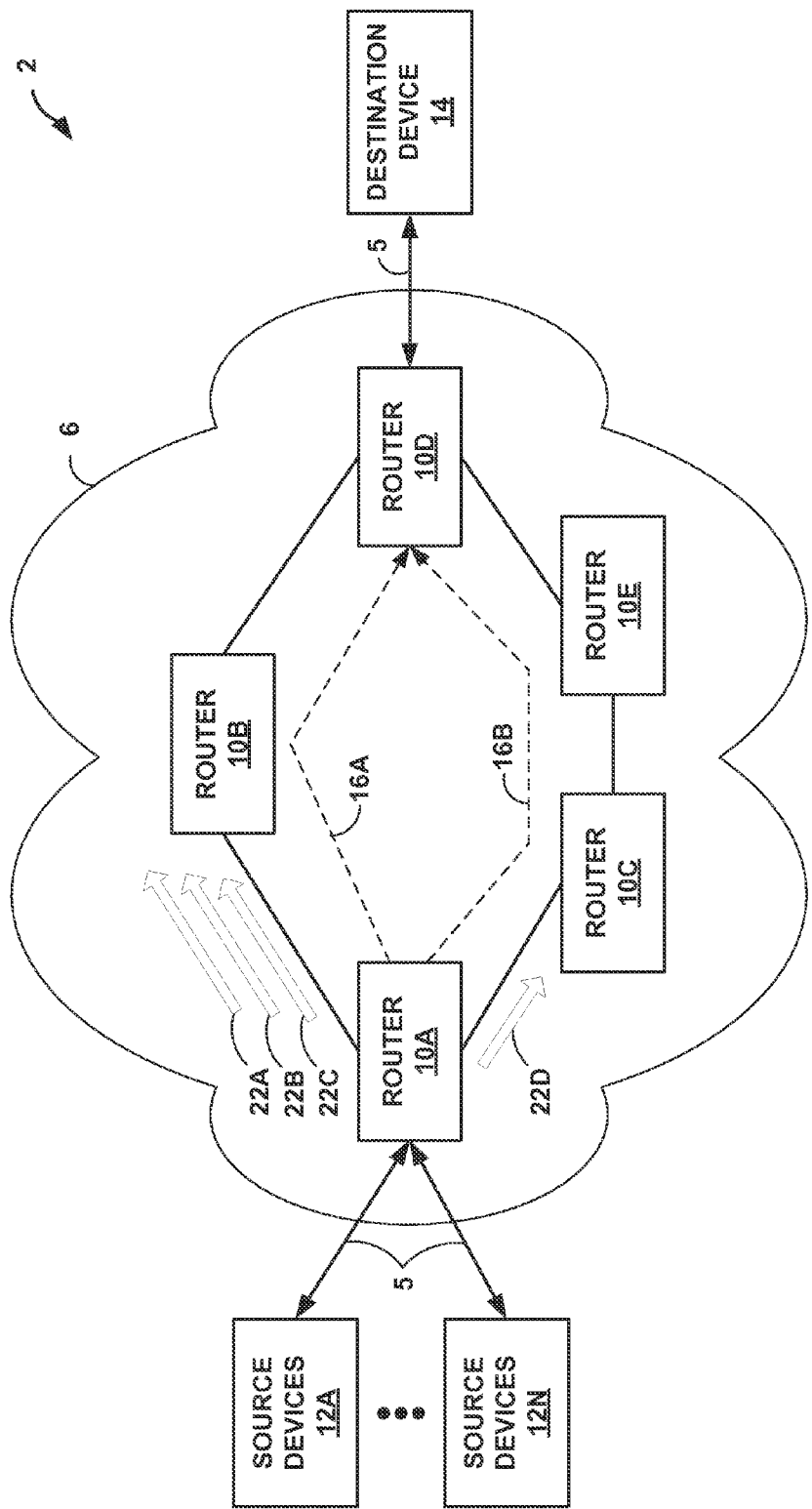
FIG. 1 is a block diagram illustrating an example network system that performs weighted equal-cost multipath (ECMP) techniques described in this disclosure.

FIG. 1 is a block diagram illustrating an example network system 2 that performs weighted equal-cost multipath (ECMP) techniques described in this disclosure. Network 6 includes routers 10A-10E ("routers 10") that route network packets, received from source devices 12A-12N ("source devices 12"), toward destination device 14. Network 6 may comprise a public network, such as the Internet, a private network, such as those owned and operated by an enterprise or service provider, or a combination of both public and private networks. As a result, network 6 may be alternately referred to herein as a Service Provider (SP) network. Network 6 may include one or more Wide Area Networks (WANs), Local Area Networks (LANs), Virtual Local Area Networks (VLANs), Virtual Private Networks (VPNs), and/or another type of network.

In some instances, network 6 may be a label switching network in which network devices such as routers 10, often referred to as Label Switching Routers or LSRs, use Multi-Protocol Label Switching (MPLS) signaling protocols to establish Label Switched Paths (LSPs) for transporting the network packets received from source devices 12. The MPLS data-carrying mechanism of network 6 may be viewed as lying between layer 2 and layer 3 of the Open Systems Interconnection (OSI) model and is often referred to as a layer 2.5 protocol. Reference to layers followed by a numeral may refer to a particular layer of the OSI model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Further information regarding MPLS and the various features of MPLS, as well as, general architectural information regarding MPLS can be found in Request for Comments (RFC) 3031, titled "Multi-protocol Label Switching Architecture," prepared by the Network Working Group of the Internet Engineering Task Force (IETF), dated January 2001, incorporated by reference herein. In some instances, network 6 may offer Generalized MPLS (GMPLS). Although described herein in some instances with respect to MPLS, the techniques of this disclosure are also applicable to GMPLS.

Thus, although shown as a single network 6 in FIG. 1, network 6 may comprise any number of interconnected networks, either public or private, in which the various networks interconnect to form various virtual networks. In addition, network 6 may include a variety of other network devices for forwarding network traffic, such as additional routers, switches, or bridges. The particular configuration of network system 2 is merely an example, and routers 10 may reside in a single network or within multiple networks. Although described with respect to routers, aspects of the techniques are applicable to other network devices, such as bridges, switches, gateways, network caches, and network acceleration devices.

In the example of FIG. 1, network system 2 includes a number of source devices 12 and a destination device 14 coupled to an intermediate network 6. Each of source devices 12 and destination device 14 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, a server, or another type of device capable of interfacing with and communicating over network 6.

Source devices 12 and destination device 14 connect to network 6 via access links 5 that may comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), or wired Ethernet.

A number of physical and virtual communication links of network 6 interconnect routers 10 to facilitate control and data communication between the routers. Physical links of network 6 may include, for example, Ethernet PHY, Synchronous Optical Networking (SONET)/Synchronous Digital Hierarchy (SDH), Lambda, or other Layer 2 data links that include packet transport capability. Logical links of network 6 may include, for example, an Ethernet Virtual LAN, an MPLS LSP, or an MPLS-TE LSP.

Routers 10 employ one or more interior gateway protocols (IGPs) to learn link states/metrics for communication links within the interior of network 6. For example, router 10A may use an Open Shortest Path First (OSPF) or Intermediate System-Intermediate System (IS-IS) protocol to exchange routing information with routers 10B-10E. Router 10A stores the routing information to a routing information base that the router uses to compute optimal routes to destination addresses advertised within network 6.

In some instances, routers 10 support traffic engineering to improve the utilization of paths through network 6. In general, traffic engineering refers to operations to move traffic flow away from the shortest path computed by an interior gateway protocol for network 6 and toward a potentially less congested or otherwise more desirable (from an operational point of view) physical path across the network. For example, a network 6 administrator or routers 10 may establish, using Resource Reservation Protocol with Traffic Engineering extensions (RSVP-TE) or another label distribution protocol (e.g., the Label Distribution Protocol (LDP)), one or more LSP tunnels that connect various pairs of routers 10 to route network traffic away from network failures, congestion, and bottlenecks. A router that comprises an interface to the LSP tunnel associates a metric with the LSP. An LSP metric may assume the metric of the underlying IP path over which the LSP operates or may be configured by an administrator of network 6 to a different value to influence routing decisions by routers 10. Routers 10 execute the interior gateway protocols to communicate via routing protocol messages and exchange metrics established for the LSP tunnels and store these metrics in a respective routing information base for use in computing optimal routes to destination addresses advertised within network 6. For example, routers 10 may advertise LSP tunnels as IGP links of network 6 using OSPF forwarding adjacencies (FAs). In addition, network operators may set IGP metrics for LSP tunnels to match default IGP metric values or to any other value. Network operators may set IGP metrics in this manner to facilitate ECMP. As used herein, therefore, the term "link" or "communication link" may also refer to an LSP operating over a layer 2 communication link. Accordingly, as used herein, the term "network link" may refer to a link, an IGP link, an LSP, or any other connection between any pair of routers 10 that may be input to a network path computation algorithm for the purpose of computing network paths between routers.

RSVP-TE-established LSPs reserve resources using path state on routers 10 to ensure that such resources are available to facilitate a class of service (CoS) for network traffic forwarded using the LSPs. For example, router 10A may issue RSVP Path messages toward router 10D to establish an LSP and to reserve an amount of bandwidth for the LSP using path state on both router 10A and router 10B. Routers 10A, 10B must maintain the reserved amount of bandwidth for network traffic mapped to the LSP until the LSP is either preempted or torn down. RSVP-TE is described more fully in Awduche et al., "RSVP-TE: Extensions to RSVP for LSP Tunnels," Request for Comments 3209, Network Working Group, Internet Engineering Task Force, December, 2001, which is incorporated by reference as if fully set forth herein.

As described herein, routers 10 may additionally distribute detailed knowledge about network loading using extensions to the IGPs. For example, routers 10 may execute IS-IS with traffic engineering extensions described herein that use new type-length values (TLVs). As another example, routers 10 may execute OSPF with traffic engineering extensions using opaque link-state advertisements (LSAs) to distribute link attributes in link-state advertisements in addition to link-state and metrics. The techniques of this disclosure prescribe the advertisement, by routers 10, of currently available bandwidth for the links of network 6, which takes into account traffic for which may otherwise be unaccounted. That is, routers 10 monitor and advertise currently available bandwidth for a link, expressed as a rate (e.g., MB/s), that takes into account bandwidth that is neither reserved via RSVP-TE nor currently in use to transport Internet Protocol (IP) packets or LDP packets over the link, where an LDP packet is a packet having an attached label distributed by LDP. Currently available bandwidth for a link is therefore neither reserved nor being used to transport traffic using unreserved resources. Routers 10 measure the amount of bandwidth in use to transport IP and LDP packets over outbound links and compute currently available bandwidth as a difference between the link capacity and the sum of reserved bandwidth and measured IP/LDP packet bandwidth. Routers 10 exchange computed available bandwidth information for their respective outbound links as link attributes in extended link-state advertisements of a link-state interior gateway protocol and store received link attributes to a respective Traffic Engineering Database (TED) that is distinct from the generalized routing information base (including, e.g., the IGP link-state database).

Router 10A executes a shortest-path first (SPF) algorithm over its routing information base to compute optimal forwarding paths through network 6 to router 10D by which destination device 14 is reachable. In some instances, router 10A may execute a constrained SPF (CSPF) algorithm over its routing information base and its traffic engineering database to compute paths for LSPs subject to various constraints, such as link attribute requirements, input to the CSPF algorithm. For example, router 10A may execute a CSPF algorithm subject to a bandwidth constraint that requires each link of a computed path from router 10A to router 10D to have at least a specified amount of bandwidth currently unreserved by RSVP-TE.

In the illustrated example, router 10A computes a SPF or CSPF algorithm over its routing information and/or TED that results in multiple shortest paths 16A-16B ("paths 16") through network 6 having equal costs. That is, a routing cost from router 10A to router 10D is equivalent between path 16A traversing routers 10A-10B-10D and path 16B traversing routers 10A-10C-10E-10D. Paths 16 may each represent an LSP or IP path, for example.

Having determined that paths 16 have equal costs to router 10D, router 10A forms an equal-cost multipath (ECMP) set composed of both paths 16. In accordance with the described techniques, router 10A additionally computes a weight for each of paths 16 based on the current minimum available bandwidth along the respective path. That is, router 10A accesses its TED and determines a minimum available bandwidth currently available for the respective set of links along each of paths 16, then computes a weight for the respective one of paths based on the determined minimum available bandwidth in accordance with a weight function. For example, router 10A may determine a minimum available bandwidth for path 16A by first reading the TED to determine an available bandwidth for the router 10A-router 10B link and the router 10B-router 10D link and then comparing the available bandwidths to find the lowest available bandwidth value for path 16A. The lowest available bandwidth value of the various links of a path may then be used as the minimum available bandwidth for path 16A (path bandwidth). In one example, the weight router 10A computes a relatively higher weight for one of paths 16 when the path has a relatively higher minimum available bandwidth.

Router 10A receives network traffic, sourced by source devices 12 and destined for destination device 14, classified to one of packet flows 22A-22D ("packet flows 22"). Router 10A assigns each of packet flows 22 to one of paths 16 that constitute the ECMP set to router 10D based on the respective computed weights for paths 16. In general, the higher the weight value, the greater the relative proportion of network traffic that router 10A assigns to the path due to the computed weight. In the illustrated example, path 16A has a higher relative minimum available bandwidth that path 16B, and router 10A accordingly computes a higher weight for path 16A than for path 16B. Upon identifying each of packet flows 22, moreover, router 10A assigns the respective packet flows 22 to paths 16 according to the computed weights for the paths. Because router 10A associates a higher weight value to path 16A, router 10A assigns a plurality of the packet flows (i.e., packet flows 22A, 22B, and 22C in this example) to path 16A, while assigning few packet flows (only packet flow 22D) to path 16B. The described techniques may be performed continually to foster dynamic load balancing of packet flows over time that changes responsive to available bandwidth conditions of the underlying links of path in the ECMP set.

The techniques of this disclosure may improve load balancing within network 6 to cause a concomitant reduction in congestion and improved network performance. Assuming, for example, that each of packets flows 22 have similar profiles with respect to the size and rate of packets classified to the packet flows, assigning packet flows 22 based on the minimum available bandwidth along each of paths 16 rather than based on round-robin techniques may provide for more equitable load balancing among paths 16, for router 10A assigns more flows to path 16A having relatively higher minimum available bandwidth than path 16B. This causes path 16A to carry a larger amount of the traffic for flows 22 relative to path 16B and thereby reduces a load on path 16B relative to equal flow distribution techniques.

Figure 2:
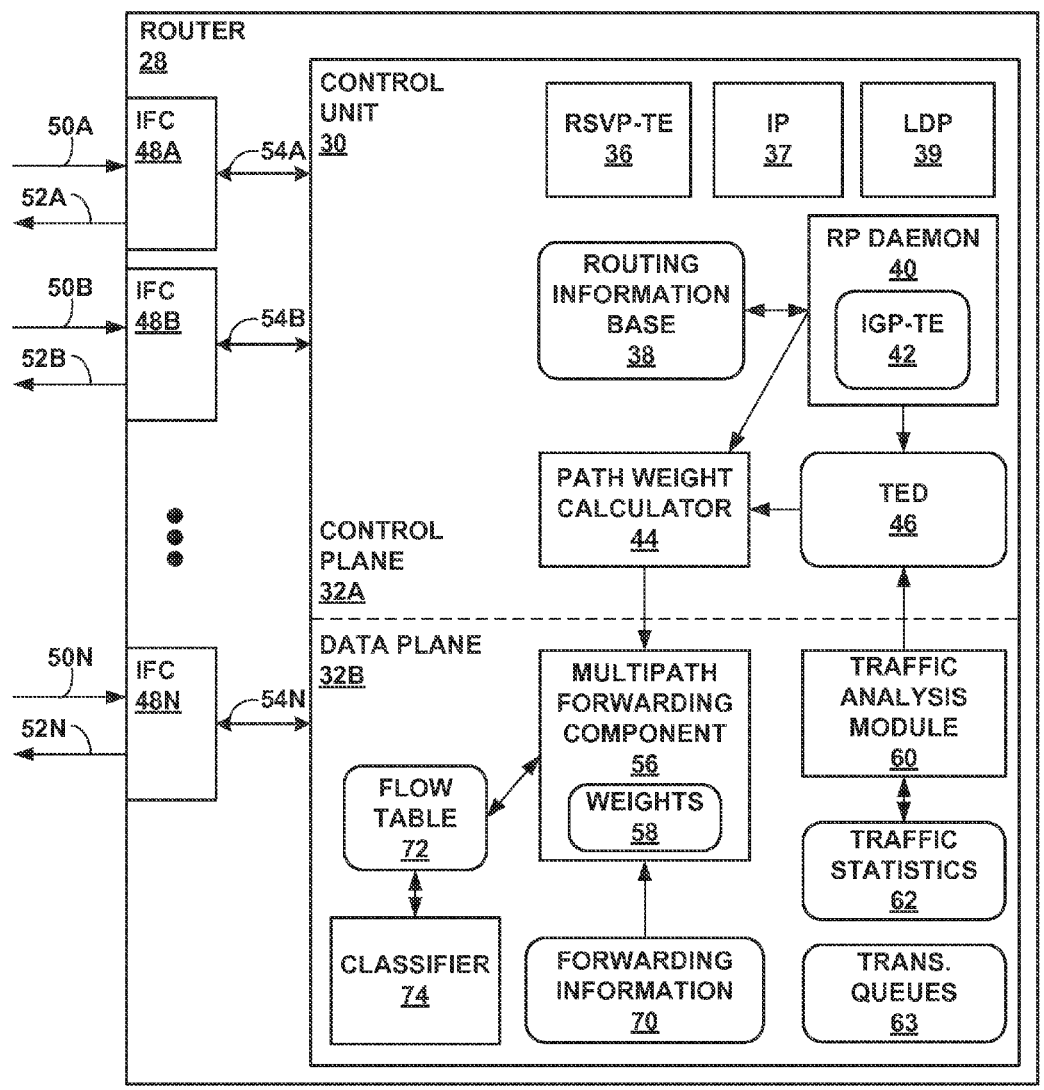
FIG. 2 is a block diagram illustrating an example router that performs the bandwidth availability determinations and weight ECMP flow-assignation techniques described in this disclosure.

FIG. 2 is a block diagram illustrating an example router 28 that performs the bandwidth availability determinations and weighted ECMP flow-assignment techniques described in this disclosure. Router 28 may represent an example embodiment of any of routers 10 of FIG. 1, routers 82 of FIG. 7, routers 202 of FIG. 8, routers 255 of FIG. 9, and routers 302 of FIG. 10.

Router 28 includes a control unit 30 and interface cards 48A-48N ("IFCs 48") coupled to control unit 30 via internal links 54A-54N. Control unit 30 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Further, while described with respect to a particular network device, e.g., a router, the techniques of this disclosure are applicable to other types of network devices such as switches, content servers, bridges, multi-chassis routers, or other device capable of performing the described techniques.

In this example, control unit 30 is divided into two logical or physical "planes" to include a first control or routing plane 32A and a second data or forwarding plane 32B. That is, control unit 30 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 32A of control unit 30 executes the routing functionality of router 28. In this respect, control plane 32A represents hardware or a combination of hardware and software of control unit 30 that implements routing protocols (not shown in FIG. 2) by which routing information stored in routing information base 38 ("RIB 38") may be determined.

RIB 38 may include information defining a topology of a network, such as network 6 of FIG. 1, learned by execution by routing protocol daemon 40 ("illustrated as RP daemon 40") of Interior Gateway Protocol with Traffic Engineering extensions 42 ("IGP-TE 42"). For example, RIB 38 may include a link-state database of physical and logical links (e.g., LSPs advertised as forwarding adjacencies). RIB 38 also includes a forwarding database that stores routes calculated by RP daemon 40 for various destinations. IGP-TE 42 may represent an embodiment of any interior routing protocol that announces and receives link attributes for links of the network. For example, IGP-TE 42 may represent OSPF-TE or IS-IS-TE. RIB 38 may also include an MPLS routing table that stores MPLS path and label information for LSPs through the network. In such instances, IGP-TE 42 advertises LSPs and associated metrics as forwarding adjacencies to other instances of IGP-TE executing on additional routers of the network.

RP daemon 40 (e.g., routing protocol software executing on control unit 30 of router 28) may resolve the topology defined by routing information in RIB 38 to select or determine one or more active routes through the network to various destinations. Control plane 32A may then update data plane 32B with these routes, where data plane 32B maintains these routes as forwarding information 70 that maps network destinations to one or more outbound interfaces 52. Forwarding or data plane 32B represents hardware or a combination of hardware and software of control unit 30 that forwards network traffic received by interface cards 48 via inbound links 50A-50N over outbound links 52A-52N of interface cards 48 in accordance with forwarding information 70 and/or flow table 72. For example, aspects of data plane 32B may be implemented within router 28 as one or more packet forwarding engines ("PFEs") each associated with a different one of IFCs 48 and interconnected to one another via a switch fabric.

Control plane 32A also includes RSVP-TE 36, IP 37, and LDP 39. IP 37 is used by router 28 to support IP-based forwarding that does not use MPLS labels or LSPs. LDP 39 is a signaling protocol that is used for distributing labels associated with LSPs in a network.

RSVP-TE 36 of control plane 32A is a signaling protocol that can be used to establish explicitly routed LSPs over a network. RSVP-TE 36 may receive an explicit routing path from an administrator, for example, for a new LSP tunnel as well as a configured metric for the LSP tunnel. RSVP-TE 36 requests downstream routers to bind labels to a specified LSP tunnel set up by router 28 and may direct downstream routers of the LSP tunnel to reserve bandwidth for the operation of the LSP tunnel. In addition, RSVP-TE 36 installs MPLS forwarding state to forwarding information 70 to reserve bandwidth for one of outbound links 52 of IFCs 48 for the LSP tunnels and, once the LSP is established, to map a label for the LSP to network traffic, which is then forwarded by data plane 32B in accordance with the MPLS forwarding state for the LSP. The set of packets assigned by router 28 to the same label value for an LSP tunnel belong to a particular forwarding equivalence class (FEC) and define an RSVP flow.

Traffic analysis module 60 of data plane 32B can monitor traffic through data plane 32B (e.g., LDP or IP traffic) that is not associated with reserved bandwidth, and generate traffic statistics 62. Traffic analysis module 60 may, for example, monitor the amount of LDP traffic being output on each of outbound links 52. In some embodiments, traffic analysis module 60 may control the granularity of traffic statistics 36. For example, in one embodiment, traffic analysis module 60 may only monitor and generate statistics for a total amount of LDP traffic being output from router 28 on each one of outbound links 52. In other embodiments, traffic analysis module 60 may, however, generate more granular traffic statistics by monitoring the different types of traffic. For example, traffic analysis module 60 may track the amount of LDP traffic output on each of outbound links 52 as well as the amount of IP traffic output on each of outbound links 52. Aspects of traffic analysis module 60 may be distributed to control plane 32A in various instances of router 28.

In accordance aspects of this disclosure, traffic analysis module 60 calculates the amount of bandwidth available on one or more outbound links 52 associated with router 28. Traffic analysis module 60 calculates the available bandwidth using the statistics stored in traffic statistics 36, i.e., statistics for current consumption of non-reserved bandwidth, as well as the reservation requests stored in forwarding information 70. In this manner, traffic analysis module 60 accounts for both the amount of bandwidth reserved for RSVP-TE traffic and the amount of LDP or other traffic currently using bandwidth of outbound links 52. As a result, traffic analysis module 60 may generate bandwidth availability information for each of outbound links 52. For each of outbound links 52, traffic analysis module 60 may, for example, calculate the available bandwidth information by averaging the amount of LDP traffic over time, and subtracting the average LDP traffic and the amount of reserved bandwidth from a total capacity associated with each of the links. Alternatively, or in addition, the techniques may be used to account for IP traffic or other traffic output on outbound links 52 that is not associated with reserved resources. For example, for each of outbound links 52, traffic analysis module 60 may monitor the IP traffic, and traffic analysis module 60 calculates an average amount of IP traffic over a configurable period. Traffic analysis module 60 calculates the available bandwidth by taking the capacity of the link minus the monitored traffic statistics minus the RSVP reservations. Traffic analysis module 60 stores the calculated bandwidth availability information to traffic engineering database ("TED 46").

Traffic analysis module 60 may monitor traffic by monitoring transmission queues 63 (illustrated as "trans. queues 63") for outbound interfaces to outbound links 52. After data plane 32B sends a packet to an outbound interface, the one of interface cards 48 that includes the outbound link 52 associated with the outbound interface queues the packet for transmission on one of transmission queues 63. Many different transmission queues 63 representing different classes of service may be mapped to each of outbound links 52, and the amount of time that a packet remains in a queue strongly correlates to the amount of available bandwidth of the corresponding link. Each physical or logical link (e.g., an LSP) is associated within forwarding information 70 with one of the transmission queues 63 for the outbound interface for the link. RSVP-TE 28 reserves for a reservation-oriented forwarding class some proportion of the bandwidth for the outbound link by installing reservation state in forwarding information 70. In effect, this associates RSVP LSPs with one of transmission queue 63 that has assured (i.e., reserved) bandwidth.

Traffic analysis module 60 may periodically monitor available bandwidth for outbound links by monitoring the transmission queues 63 for classes of service that have no assured bandwidth. Traffic analysis module 60 may, for instance, periodically determine the queue sizes for non-bandwidth-assured ones of transmission queues 63 and apply a function to the queue sizes that returns an amount of available bandwidth for the link based on the queue sizes. As another example, traffic analysis module 60 may periodically set a timer to first measure the length of time between enqueuing and dequeuing a particular packet for transmission and then apply a function to that returns an amount of available bandwidth for the link based on the measured length. The function may include link capacity and reserved bandwidth parameters to compute available bandwidth as a difference between link capacity and a sum of reserved bandwidth and IP/LDP bandwidth presently in use.

In some examples, traffic analysis module 60 copies the determined available bandwidth to TED 46. In some instances, traffic analysis module 60 stores a time-series of periodically determined available bandwidths for each of outbound links 52 to traffic statistics 62 and applies a smoothing function, such as a moving average filter, weighted moving average filter, or exponentially weighted moving average filter, to the set of time-series to attenuate traffic bursts over the outbound links. When traffic analysis module 60, for any one of outbound interfaces 52, determines the moving average exceeds a threshold increase or threshold decrease from an available bandwidth value previously copied to TED 46, traffic analysis module 60 copies the moving average as the new available bandwidth value for the corresponding link to TED 46. Copying of the new available bandwidth value, by traffic analysis module 60 to TED 46, may trigger an IGP advertisement by IGP-TE 42 of available bandwidth for the link. In some instances, IGP-TE 42 reads traffic statistics 62 to determine available bandwidth for a link.

As mentioned above, IGP-TE 42 can advertise the calculated bandwidth availability information of TED 46 to other routing devices as a minimum bandwidth link attribute for corresponding links. In addition, IGP-TE 42 receives bandwidth availability information from the other routing devices for other links in the network and updates TED 46 with the received bandwidth availability information. In this manner, router 28 maintains accurate bandwidth availability information for links for an entire network, e.g., network 6 of FIG. 1.

In instances of network 2 that provide Differentiated Services, or "DiffServ TE," RSVP-TE may reserve resources according to a number of traffic classes. Differentiated Services in the context of traffic engineering is described in Minei et al., "Extensions for Differentiated Services-aware Traffic Engineered LSPs," Internet Draft, Network Working Group, Internet Engineering Task Force, June, 2006, which is incorporated by reference as if fully set forth herein. In such instances, traffic analysis module 60 determines available bandwidth for each traffic class linked to DiffServ code points in the data plane, and IGP-TE 42 advertises each of the available bandwidths for the traffic classes to other instances of IGP-TE executing in other routers. As described in further detail below, classifier 74 and multipath forwarding component 56 then operate using class-based available bandwidths when load balancing network traffic for the classes.

Router 28 employs equal-cost multipath (ECMP) routing techniques to distribute network traffic load over multiple equal-cost paths through the network. RP daemon 40 executes an SPF algorithm over a link-state database of RIB 38 (or a CSPF algorithm over TED 46 in addition to the link-state database of RIB 38) to identify multiple equal-cost paths to the same destination. RP daemon 40 forms an ECMP set composed of the equal-cost paths and derives one or more forwarding structures from the calculated paths to maintain the equal-cost paths in the form of multiple possible next-hops to the same destination. RP 40 daemon then installs these forwarding structures to forwarding information 70, and data plane 32B may use any available forwarding structures derived from the ECMP set in forwarding network traffic flows toward the destination. In some examples, a set of multiple paths may be selected that are not necessarily equal-cost paths. RP daemon 40 may select a set of acceptable non-looping paths, where the selection may be done based on other constraint(s).

Upon identifying an ECMP set, RP daemon 40 additionally prompts path weight calculator 44 of control plane 32A to compute a weight for each path in the ECMP set according to a minimum available bandwidth for the path, or according to an amount of bandwidth for the outgoing interfaces as described in examples below. Path weight calculator 44 determines the network links that constitute each path in the ECMP and, for each link in the path, reads TED 46 to identify an available bandwidth for the link. To determine a minimum available bandwidth for the path, path weight calculator 44 identifies the minimum available bandwidth value for all of the links that constitutes the path.

Based on the minimum available bandwidth values or path bandwidth values determined for the various paths in the ECMP set, path weight calculator then determines a relative weight to be applied by multipath forwarding component 56 for each path. For example, path weight calculator 44 may set relative weights for each path in an ECMP set according to ratios of minimum available bandwidths or path bandwidth for each path to the smallest minimum available bandwidth of any path in the ECMP set. For instance, if path A of an ECMP set has a minimum available bandwidth of 10 MB/s, path B of the ECMP set has a minimum available bandwidth of 50 MB/s, and path C of the ECMP set has a minimum available bandwidth of 25 MB/s, the path weight calculator 44 may compute the weights for paths A, B, C to 2, 10, and 5, respectively, to reflect the minimum available bandwidth ratios for the ECMP set. Path weight calculator 44 may in other examples use other formulas for computing weights for the paths in an ECMP set. Path weight calculator 44 installs computed weights for an ECMP set to weights 58 of multipath forwarding component 56.

In some aspects, classifier 74 identifies new packet flows and classifies inbound packets received on inbound links 50 to packet flows referenced by flow table 72. A "packet flow," as used herein, refers a set of packet header field values and/or packet data that cause any packet containing such values to be assigned to a particular path in an ECMP set toward that packet's destination. In addition, a packet flow is the minimum granularity at which router 28 maintains state in flow table 72 for forwarding network packets that are classified to a packet flow referenced in flow table 72. Classifier 74 may classify packets to a packet flow referenced in flow table 72 by, for example, their respective <source IP address, destination IP address, protocol identifier> 3-tuple value or by their respective <source IP address, destination IP address, source port, destination port, protocol identifier> 5-tuple value.

Flow table 72 comprises a data structure, e.g., a table, for storing information or data in packet flow entries each pertaining to a different packet flow traversing router 28. Such data includes in some instances a reference to a next-hop structure in forwarding information 70 that specifies a path in an ECMP set. Although illustrated and described as a table, the data in flow table 72 may be stored to any other data structure, such as a graph, a linked-list, etc. Flow table 72 stores data describing each flow previously identified by classifier 74, e.g., the five-tuple and other information pertinent to each flow. That is, flow table 72 may specify network elements associated with each active packet flow, e.g., source and destination devices and ports associated with the packet flow. Flow table 72 may also include a unique application identifier (ID) for each flow that uniquely identifies the application to which each flow corresponds.

When classifier 74 identifies a new flow, multipath forwarding component 56 may determine that forwarding information 70 includes multiple possible next-hops to the destination for the flow. In other words, multipath forwarding component 56 determines there is an available ECMP set for the flow. Multipath forwarding component 56 therefore applies respective weights 58 for the next-hops of the ECMP set and assigns the new flow to one of the next-hops according to the weights. Multipath forwarding component 56 may apply an algorithm that is parameterized according to the weights 58 of the ECMP set for the new flow destination and use the result of the function to select one of the possible next-hops for flow assignment. For example, in some instances, multipath forwarding component 56 applies a weighted round-robin algorithm that is weighted according to the weights 58 of the ECMP set to select one of the possible next-hops for new packet flows destined for a destination served by the ECMP set. As another example, in some instances, multipath forwarding component 56 applies weighted hashed mode techniques to, first, increase the number of hash buckets for paths in the ECMP set according to weights 58 for the paths and then hash, e.g., the source/destination addresses of the new flow to select a hash bucket and an associated path in the ECMP set for the new flow.

To associate the new flow with the selected next-hop, multipath forwarding component 56 adds a reference (e.g., a pointer that resolves to a next-hop or an index) to the selected next-hop in the forwarding information 70 in the flow table 72 entry generated by classifier 74 for the new flow. The reference to the selected next-hop in the flow table 72 entry for the new flow causes multipath forwarding component of data plane 32B to forward packets of the new flow to the selected next-hop. As a result, router 28 assigns packet flows and balances network traffic loads according to a minimum available bandwidth for various paths of an ECMP set that serves destinations for the packet flows.

Figure 3:
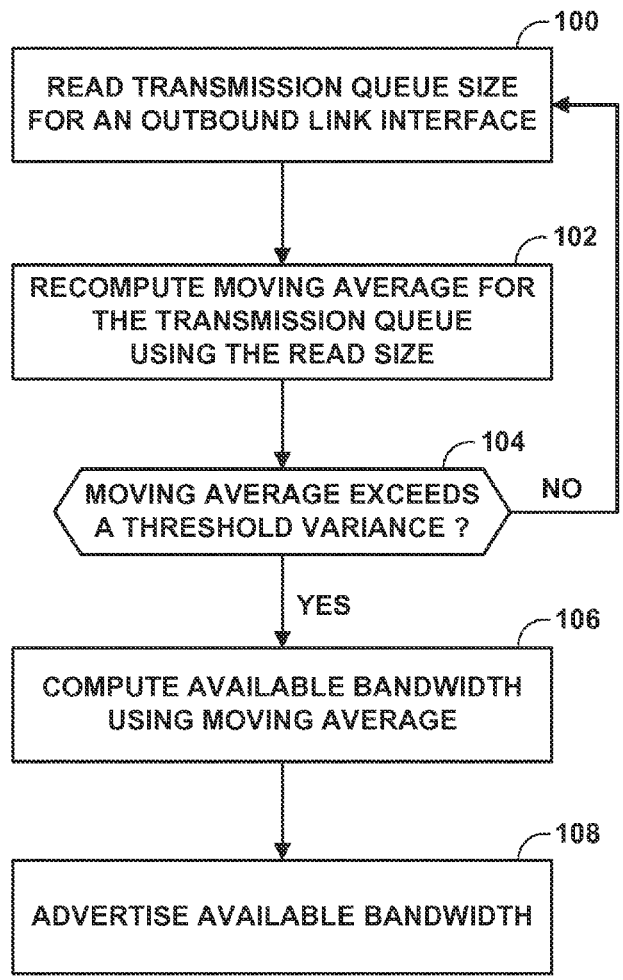
FIG. 3 is a flow chart illustrating an example operation of the example router of FIG. 2 to advertise available bandwidth for neighboring links by analyzing interface transmission queue characteristics in accordance with the techniques described in this disclosure.

FIG. 3 is a flow chart illustrating an example operation of router 28 of FIG. 2 to advertise available bandwidth for neighboring links by analyzing interface transmission queue characteristics in accordance with the techniques described in this disclosure. To determine bandwidth in use by non-reserved (e.g., IP and LDP) traffic, traffic analysis module 60 reads a size of a transmission queue (i.e., the number of packets queued for transmission) for an interface for one of outbound links 52 (100). Traffic analysis module 60 stores the read size value to traffic statistics 62 and recomputes a moving average of the transmission queue size using the additional data point, i.e., the read size (102). If the moving average exceeds a threshold variance (e.g., 5% or an absolute value variance) from a previous moving average value used by traffic analysis module 60 as a basis for updating an available bandwidth value for the link (YES branch of 104), then traffic analysis module 60 computes the available bandwidth for the link using the moving average (106), where the available bandwidth on the link is inversely correlated to the moving average of the size of the transmission queue for the link. Traffic analysis module may, for example, compute available bandwidth for a physical or logical link as a difference between the link capacity and the sum of reserved bandwidth and measured IP/LDP packet bandwidth. Traffic analysis module 60 stores the available bandwidth to TED 46 for advertisement by IGP-TE 42 to other instances of the routing process in other routers.

Figure 4:
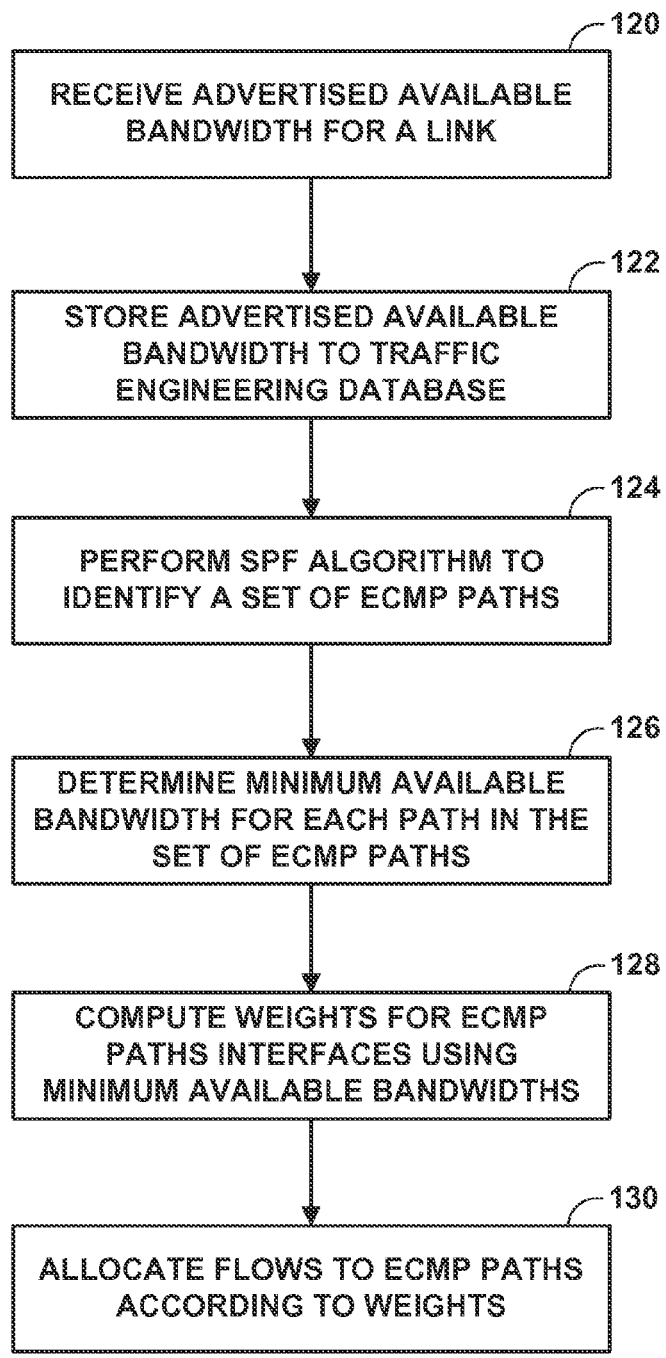
FIG. 4 is a flowchart illustrating an example operation of the example router of FIG. 2 to compute respective weights for paths of an ECMP set and to allocate flows to paths of the ECMP in accordance with the weights in the manner described herein.

FIG. 4 is a flowchart illustrating an example operation of router 28 of FIG. 2 to compute respective weights for paths of an ECMP set and to allocate flows to paths of the ECMP in accordance with the weights in the manner described herein.

RP daemon 40 executes IGP-TE 42 to receive advertisements formed in accordance with traffic engineering extensions to include available, unreserved bandwidth for advertised links (120). IGP-TE 42 stores advertised available bandwidth values for advertised links in TED 46 (122).

RP daemon 40 executes a shortest-path first algorithm over link-state information in RIB 38 to compute optimal (according to IGP metrics in RIB 38) forwarding paths from router 28 to various destinations. In some cases, RP daemon 40 identifies multiple optimal, equal-cost forwarding paths to a particular destination or set of destinations and, in such cases, creates an ECMP set composed of the multiple equal-cost forwarding paths (124).

Path weight calculator 44 analyzes respective links that constitute the various forwarding paths in the ECMP to determine minimum available bandwidths for the paths (126). For example, path weight calculator 44 reads available bandwidth values for each link in a path and determines the minimum available bandwidth value among all such values for the various links. This minimum available bandwidth value is the minimum available bandwidth for the corresponding path. Path weight calculator 44 uses the minimum available bandwidth determined for each of the paths in the ECMP set to compute relative weights for the paths and stores these weights to weights 58 (128). A relatively higher computed weight indicates a greater amount of minimum available bandwidth for a path in the ECMP set vis-à-vis the other paths. Multipath forwarding component 56 allocates new packet flows destined for destinations served by the ECMP set and identified by the classifier 74 to paths in the ECMP set in accordance with respective weights 58 for the paths (130).

FIG. 5 is a block diagram illustrating an example encoding of the available bandwidth information described herein for the IS-IS routing protocol. In general, an IS-IS link state PDU is composed of a fixed header and a number of tuples, each consisting of a Type, a Length, and a Value (TLV). Generally, routers 10 of FIG. 1 use flooding-based routing protocols to announce topology information to each other and synchronize link-state databases maintained by each of the routers. As described herein, routers 10 support an enhanced interior gateway protocol that has been extended in the manner described herein by which routers 10 may advertise available bandwidth information determined by the routers for neighboring links.

In the illustrated example, a new, opaque Type, Length, Value (TLV) 140 is defined that can be carried by various types of link state messages that are already used within network system 2 of FIG. 1. TLV 140 includes a TYPE field 144, a LENGTH field 146, and a VALUE field 142 that includes AVAILABLEBANDWIDTH field 148.

TYPE field 144 has a length of one octet that specifies a unique identifier for the new TLV defined herein for carrying the burst rate and average rate control information for the flooding-based routing protocol. LENGTH field 146 is one octet in length and indicates the length of the VALUE field 142 in octets, i.e., 4 in this example TLV.

AVAILABLEBANDWIDTH field 148 carried by VALUE field 142 specifies a rate of available bandwidth for a link associated with TLV 140. AVAILABLEBANDWIDTH field 148 has a four-octet value that carries a single-precision floating point value to store the rate of available bandwidth in, e.g., kilobytes/sec. TLV 140 may be associated with a link by inclusion in an IS-IS message that provides link-state for the link. IS-IS allows the inclusion of TLVs in any kind of IS-IS message and the protocol specification requires that unrecognized TLVs are to be ignored by the routers. In this manner, TLV 140 is referred to herein as an opaque TLV and the techniques described herein allow for routers 10 to extract and record the current available bandwidth for the associated link.

TLV 140 may be carried by a variety of different types of link state messages used within network system 2. For example, routers 10 typically exchange initial link state messages to establish the adjacency relationship. For example, routers 10 may exchange IS-IS HELLO protocol data units (PDUs) to establish adjacencies with other routers. Routers 10 may include TLV 140 described herein within these initial PDUs so as to inform the other routers as to the available bandwidth on neighboring links. In addition, or alternatively, routers 10 opaquely include TLV 140 within the flooding-based link state messages to synchronize traffic engineering databases maintained by each of the routers. Each link state message is typically refreshed periodically on the network and is acknowledged by the receiving routers. For example, routers 10 may utilize periodic IS-IS link state PDUs for synchronizing their link-state databases and utilize partial sequence number PDUs (PSNPs) and complete sequence number PDUs (CSNPs) to acknowledge receipt of the information. Routers 10 may embed TLV 140 within the link state PDUs, or, more likely, within the acknowledgement PDUs.

As another example, routers 10 may exchange opaque OSPF link-state advertisements (LSAs), such as traffic engineering LSAs, that carry TLV 140. Traffic engineering LSAs are described in RFC 3630, "Traffic Engineering (TE) Extensions to OSPF Version 2," Network Working Group, September 2003, which is incorporated by reference herein. In a traffic engineering LSA, a link TLV describes a single link and includes a set of sub-TLVs. TLV 140 may be defined as a new sub-TLV type for a link TLV that specifies currently available bandwidth for the described link that is neither reserved nor currently in use to transport Internet Protocol (IP) packets or LDP packets over the link. In this manner, routers 10 exchange available bandwidths for network 6 links to enable the weighted ECMP techniques described herein.

Techniques are described herein for an example ECMP load balancing algorithm, which includes four rules added to the Dijkstra/SPF algorithm to compute the path bandwidth and/or delay along each forwarding path while the shortest-path tree is computed. Dijkstra's algorithm is a graph search algorithm that solves the single-source shortest path problem for a graph with nonnegative edge path costs, producing a shortest path tree. For a given source vertex (node) in the graph, the algorithm finds the path with lowest cost (i.e., the shortest path) between that vertex and every other vertex. The techniques of this disclosure provide an adapted Dijkstra's algorithm that uses four rules to compute the path bandwidth and/or delay along each forwarding path.

The techniques of this disclosure allow a computing router to derive the load balancing weights to use on outgoing interfaces associated with the shortest path. Some aspects of the techniques are described with reference to router 28 of FIG. 2. For example, RP daemon 40 of router 28 executes a shortest path first algorithm, such as Dijkstra's algorithm, to compute one or more paths from a root $N_1$ to every other node in the network (including a destination D). RP daemon 40 may execute the shortest path first algorithm over link-state information in RIB 38 to compute the ECMP paths according to IGP metrics in RIB 38. In some cases, RP daemon 40 identifies multiple equal-cost forwarding paths to a particular destination or set of destinations that satisfy one or more constraints and, in such cases, creates an ECMP set composed of the multiple equal-cost forwarding paths.

RP daemon 40 of router 28 moves nodes from a set of paths in a TENT list to a shortest path. RP daemon 40 selects a next node from a set of paths to move to a TENT list based on the four rules set forth herein, where the TENTS list is a data structure. When RP daemon 40 finds multiple paths to the same destination D, the root $N_1$ modifies the weight of each path from a load balancing perspective. That weight may be determined based at least in part on the minimum bandwidth across each path.

In one example, router 28 may use the following four rules when computing the bandwidth and the weights for the paths: (1) The link bandwidth associated with a set of parallel links between two adjacent nodes is computed as a sum of the individual link bandwidths of each of the parallel links between the two adjacent nodes; (2) The path bandwidth of a forwarding path is computed as the minimum value of the link bandwidths associated network links across the hops of a path; (3) If there are multiple paths to a destination with the same metric C, the weight of each different outgoing interface (OIF) is proportional to the path bandwidth computed across each path; (4) If in the scenario of rule (3) If there are multiple paths to a destination with the same metric C, and there are multiple paths sharing the same OIF, all the bandwidth units per next-hop should be determined, such that the computing router can assign weights accordingly. Each of the four rules is described in further detail below.

Figure 6:
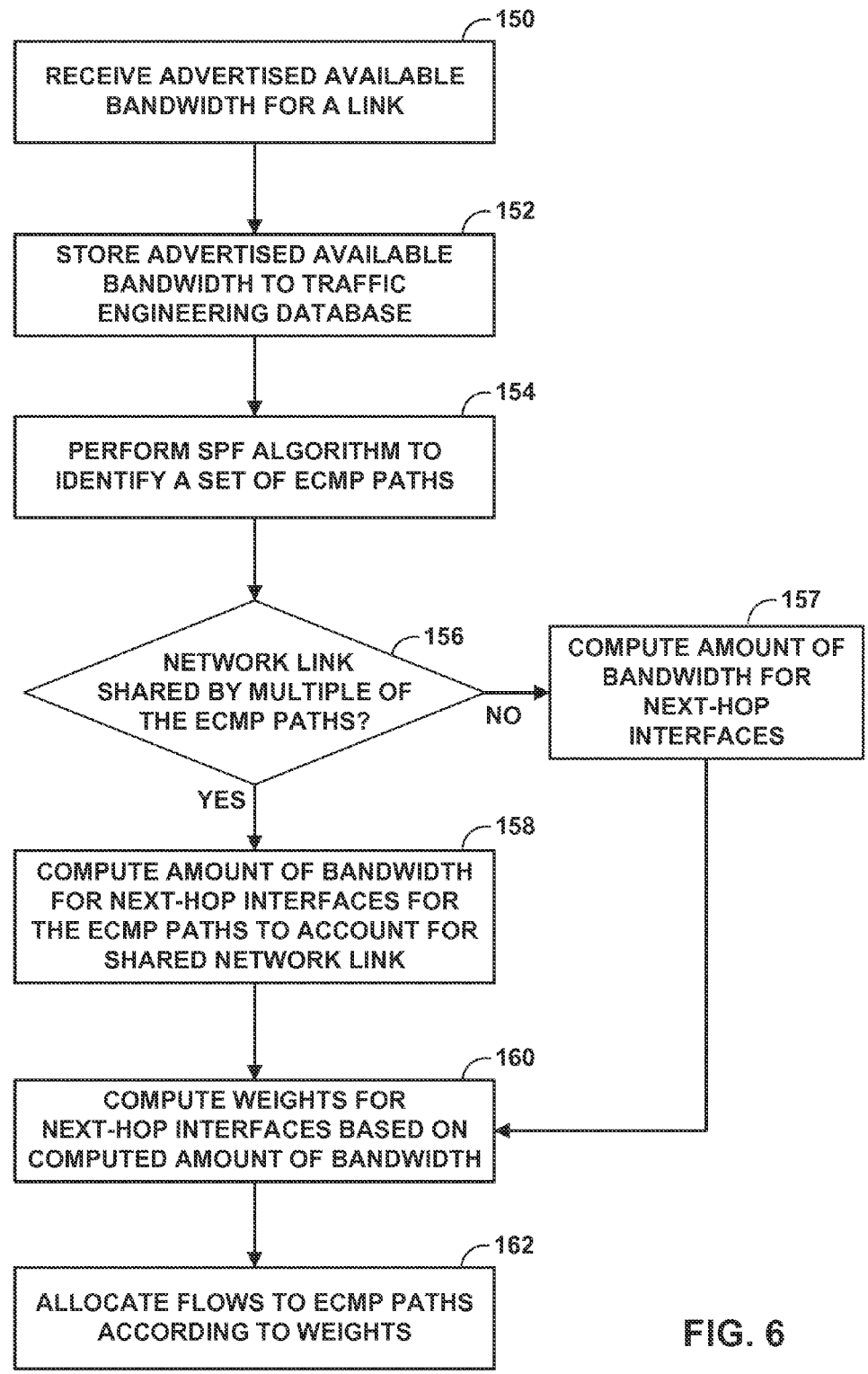
FIG. 6 is a flowchart illustrating another example operation of the example router of FIG. 2 to compute respective weights for paths of an ECMP set and to allocate flows to paths of the ECMP in accordance with the weights in the manner described herein.

FIG. 6 is a flowchart illustrating another example operation of the example router of FIG. 2 to compute respective weights for paths of an ECMP set and to allocate flows to paths of the ECMP in accordance with the weights in the manner described herein. RP daemon 40 executes IGP-TE 42 to receive advertisements formed in accordance with traffic engineering extensions to include link bandwidth for advertised links (150), such as by using the TLV 140 described in FIG. 5. For example, the advertised link bandwidth may be a maximum link bandwidth, a residual bandwidth, or an available bandwidth, as explained below. IGP-TE 42 stores advertised available bandwidth values for advertised links in TED 46 (152).

RP daemon 40 executes a shortest-path first algorithm over link-state information in RIB 38 to compute optimal (according to IGP metrics in RIB 38) forwarding paths from router 28 to various destinations. In some cases, RP daemon 40 identifies multiple optimal, equal-cost forwarding paths to a particular destination or set of destinations and, in such cases, creates an ECMP set composed of the multiple equal-cost forwarding paths (154). Path weight calculator 44 may determine whether a network link along one of the equal-cost forwarding paths is shared by more than one of the equal-cost forwarding paths (156). If path weight calculator 44 determines that a network link along one of the equal-cost forwarding paths is shared by more than one of the equal-cost forwarding paths (YES branch of 156), path weight calculator 44 takes this into account when computing an amount of bandwidth that can be sent on next-hop interfaces associated with the equal-cost forwarding paths (158). The shared network link may be directly coupled to the computing router 28, or may be one or more hops away from router 28. In this manner, router 28 can adjust the computed bandwidth so as not to overload shared network links. If path weight calculator 44 does not determine that a network link along one of the equal-cost forwarding paths is shared by more than one of the equal-cost forwarding paths (NO branch of 156), path weight calculator 44 computes an amount of bandwidth that can be sent on next-hop interfaces associated with the equal-cost forwarding paths as described herein.

For example, in computing the amount of bandwidth that can be sent on next-hop interfaces associated with the equal-cost forwarding paths, path weight calculator 44 may analyze respective links that constitute the various forwarding paths in the ECMP to determine minimum available bandwidths for the equal-cost forwarding paths. For example, path weight calculator 44 may read available bandwidth values for each link in a path and determine the minimum available bandwidth value among all such values for the various links that constitute one of the equal-cost forwarding paths. This minimum available bandwidth value may be used as the minimum available bandwidth for the corresponding path.

As another example, when IGP-TE 42 receives link bandwidth for each of a plurality of equal-cost parallel network links between two adjacent nodes of the network, where router 28 considers the parallel network links as a single path, path weight calculator 44 may sum the link bandwidth for each of the plurality of parallel network links between the two adjacent nodes to determine a link bandwidth associated with the single path of the parallel links. For example, assume there are two parallel links between nodes A and B, where link 1 has 10 Gigabits per second of available bandwidth, and link 2 has 2.5 Gigabits per second of available bandwidth. In this case, path weight calculator 44 sums the available bandwidth of links 1 and 2, and determines that the single path between nodes A and B and represented by the parallel links has an available bandwidth equivalent to 12.5 Gigabits per second. Note that if there are multiple parallel links between adjacent nodes having different metrics, only those having the minimum metric are considered by path weight calculator 44. The bandwidth is the sum of the bandwidths of only those parallel links having the minimum metric. The SPF computation is not altered, and therefore only the set of shortest paths is considered.

Path weight calculator 44 uses the computed bandwidths for the next-hop interfaces to compute relative weights for the paths and stores these weights to weights 58 (160). A relatively higher computed weight indicates a greater amount of bandwidth for an outgoing interface vis-à-vis the other outgoing interfaces. Multipath forwarding component 56 allocates new packet flows destined for destinations served by the ECMP set and identified by the classifier 74 to paths in the ECMP set in accordance with respective weights 58 for the paths (162).

The weighted ECMP techniques described herein can use any of a variety of advertised link bandwidths for computing the amount of bandwidth to be sent on each outgoing interface to each next-hop. As one example, the advertised link bandwidth may be a "maximum link bandwidth." The maximum link bandwidth defines a maximum amount of bandwidth capacity associated with a network link. As another example, the advertised link bandwidth may be a "residual bandwidth," i.e., the maximum link bandwidth less the bandwidth currently reserved by operation of a resource reservation protocol, such as being reserved to RSVP-TE LSPs. This is the bandwidth available on the link for non-RSVP traffic. Residual bandwidth changes based on control-plane reservations.

As a further example, the advertised link bandwidth may be an "available bandwidth" (also referred to herein as "currently available bandwidth"). The available bandwidth is the residual bandwidth less measured bandwidth used to forward non-RSVP-TE packets. In other words, the available bandwidth defines an amount of bandwidth capacity for the network link that is neither reserved by operation of a resource reservation protocol nor currently being used by the first router to forward traffic using unreserved resources. The amount of available bandwidth on a link may change as a result of SPF and weighted ECMP decisions, but may be a rolling average with bounded advertising frequency.

As one example, computing router can determine an amount of bandwidth capacity for a network link that is reserved by operation of a resource reservation protocol, and can determine an amount of bandwidth capacity that is currently being used by the router to forward traffic using unreserved resources, using traffic analysis module 60 to monitor traffic through data plane 32B, and may calculate the amount of residual bandwidth and/or available bandwidth as described above with respect to FIG. 2.

Various examples are described below to illustrate the techniques of this disclosure. In the examples below, the contents of the SPF entry in TENT or PATHS for a particular destination node are described by the tuple: [X, i(B), C], where X is the destination node, i is the local interface, B is the bandwidth (and hence weight assigned to that interface), and C is the IGP metric (distance from root). When multiple paths exist to a destination node X with the same metric (ECMP), the paths are represented as: [X, $I_1(B_1)/I_2(B_2)/I_n(B_n)$, C].

Figure 7:
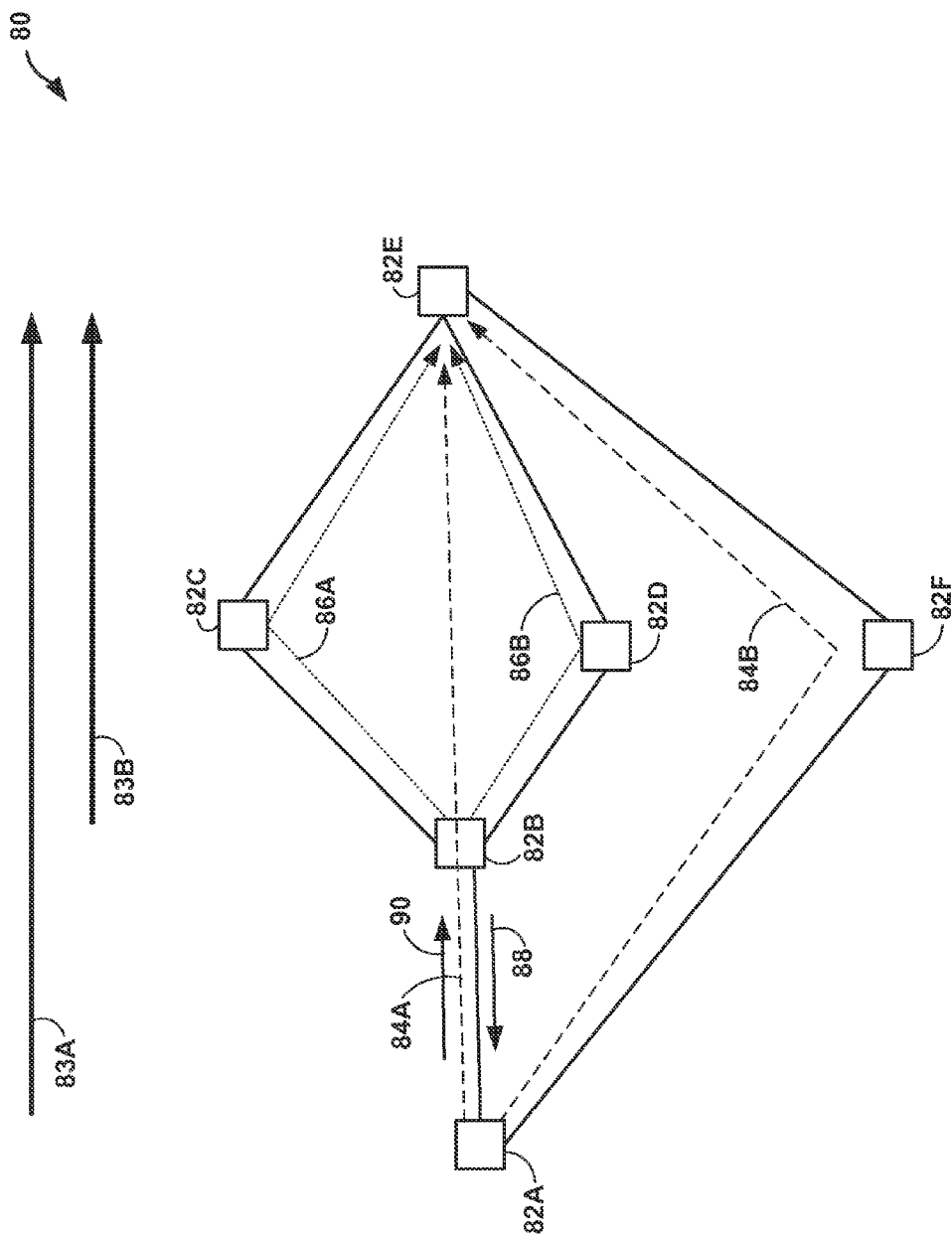
FIG. 7 is a block diagram illustrating an example network system having routers that perform weighted ECMP techniques.

FIG. 7 is a block diagram illustrating an example network system 80 having routers 82A-82F ("routers 82") that perform weighted ECMP techniques. Routers 82 may operate in a manner similar to that described with respect to any of router 28 of FIG. 2, routers 10 of FIG. 1, routers 202 of FIG. 8, routers 255 of FIG. 9, and routers 302 of FIG. 10. The illustrated network system 80 provides an example in which two paths 84A, 84B traverse a common link 32. Composite link 83B from router 82B to router 82E includes component links 86A, 86B that are each LSPs from router 82B to router 82E. Composite link 83A from router 82A to router 82E includes component links 84A, 84B that are each LSPs from router 82A to router 82E. Composite link 83A includes composite link 83B as a transport link of component link 84A, thus illustrating the possibility of recursion among composite and component links.

Routers 82 use the techniques of this disclosure to advertise available bandwidth for composite links 83A-83B ("composite links 83") as a function of the minimum available bandwidth of respective components links of the composite links. Router 82B determines minimum available bandwidths of each of component links 86A, 86B for composite link 83B using techniques described herein. For example, router 82B may determine minimum available bandwidths of each of component links 86A, 86B by receiving available bandwidth advertisements from routers 82C, 82D for the router 82C-82E link and the router 82D-82E link, respectively. Router 82B may independently determine available bandwidths over the router 82B-82C link and the router 82B-82D link by, for instance, analyzing the respective transmission queues for the links.

In one example aspect, router 82B can advertise, in one or more IGP-TE advertisements 88 to router 82A, the individual available bandwidths of each of the component links 86A, 86B. For example, router 82 may use IS-IS-TE or OSPF-TE to advertise the bandwidth of each link, so in the parallel link case, the node at the root computes the aggregate bandwidth for the composite link 83B. In the non-parallel link case, it is considered as a single path, so the root has to sum of the bandwidth. Typically, if there are parallel links in the network, IS-IS will suppress this information and the other nodes in the network will be unaware of the parallel links. This technique relies upon the ability to un-suppress parallel adjacencies in IS-IS, so that IS-IS advertises an adjacency to an intermediate system. So IS-IS can be modified to un-suppress parallel adjacencies. This allows IS-IS to support the first rule of summing the bandwidth for parallel links. OSPF already supports un-suppressed parallel adjacencies.

Router 82A can then use the advertised available bandwidth for each of component links 86A, 86B when running the SPF computation, to determine weights for load balancing across forwarding paths. For example, router 82A may, during the SPF computation, compute an aggregate bandwidth for composite link 83B by summing the individual available bandwidths of each of the component links 86A, 86B. Router 82A can then in turn use the computed aggregate bandwidth for composite link 83B in the process of obtaining an amount of available bandwidth for composite link 83A. Alternatively, router 82A may not explicitly compute an intermediate value of available bandwidth for composite link 83B in the process of obtaining an amount of available bandwidth for composite link 83A.

In another example aspect, router 82B can compute an available bandwidth for composite link 83B as a sum of the minimum available bandwidths for component links 86A, 86B and can advertise, in IGP-TE advertisement 88 to router 82A, the available bandwidth as a link attribute for composite link 83B. To router 82A that receives IGP-TE advertisement 88, in this example composite link 83B may appear to be a single link in a component link 84A towards router 82E and may be used by router 82A in a shortest-path first determination.

Router 82A may then use the advertised available bandwidth for composite link 83B, received in IGP-TE advertisement 88, when performing WECMP to load balance network traffic over component links 84A, 84B of composite link 83A. For example, the available bandwidth for composite link 83B may represent the minimum available bandwidth of any sub-link of component link 84A of composite link 83A. As a result, router 82A may compute a relative weight for component link 84A using the available bandwidth for composite link 83B and load balance network traffic between the component links 84A, 84B of composite link 83A according to the computed, relative weight using techniques described above.

The composition of component links 83 may change due to addition or deletion of respective component links therein. In such circumstances, routers 82 can recompute and/or advertise available bandwidths for modified composite links 83 using the new respective set of component links for the composite link.

A network service provider or other administrator 80 may establish an RSVP-TE signaled LSP from router 82A to router 82E that traverses router 82B toward router 82E via composite link 83B. Router 82B and router 82E, as an aspect of RSVP-TE signaling, assign the LSP to both component links 86A, 86B of composite link 83B. In other words, the label associated with the LSP from router 82B to router 82E is valid on both component links 86A, 86B for tunneling over the component links from router 82B to router 82E. Because the label for the RSVP-TE signaled LSP identifies a forwarding equivalence class at router 82B, each separate network packet flow carried by the LSP may be load-balanced by router 82B over component links 86A, 86B using the weighted ECMP techniques described in this disclosure, where component link 83B effectively represents an ECMP set. In some instances, component link 86A may have different traffic characteristics unable to support the resource requirements of the RSVP-TE signaled LSP. In such instances, component link 86A is excluded from the ECMP set when load balancing over component links of composite link 83B.

Furthermore, because the RSVP-TE signaled LSP from router 82 to router 82E may be assigned to both component links 86A, 86B of composite link 83B, router 82B performs call admission control (CAC) for a PATH resource reservation request using the available bandwidth for the composite link 83B. Router 82B may use weighted ECMP techniques to allocate differently apportioned resources for respective outbound interfaces of component links 86A, 86B responsive to a PATH resource reservation request. For example, router 82B responsive to a request for 40 MB/s bandwidth over composite link 83B may reserve 30 MB/s from an outbound interface for component link 86A while reserving 10 MB/s from an outbound interface for component link 86B, in accordance with respective weights computed using minimum available bandwidths for component links 86. Router 82B ensures the bandwidth reserved responsive to a particular request is less than the available bandwidth for a particular one of component links 86.

Router 82B may dynamically reassign an RSVP-TE signaled LSP from component link 82A to component link 82B due to dynamic application by router 82B of the weighted ECMP techniques described above. Router 82B applies make-before-break (MBB) techniques described in Awduche et al., referenced above, and LSP stitching to apply a single hop stitch from component link 82A to component link 82B. LSP stitching is described more fully in Ayyangar et al., "Label Switched Path Stitching with Generalized Multiprotocol Label Switching Traffic Engineering (GMPLS TE)," Network Working Group, Request for Comments 5150, February 2008, which is incorporated herein by reference in its entirety. Router 82B may also reduce the bandwidth reserved for an RSVP-TE signaled LSP assigned to composite link 83B when router 82B detects congestion over component links 86A and/or component links 86B. In this way, router 82B may avoid total preemption of the LSP in favor of partial preemption, which is described more fully in Polk et al., "A Resource Reservation Protocol (RSVP) Extension for the Reduction of Bandwidth of a Reservation Flow," Network Working Group, Request for Comments 4495, May 2006, which is incorporated herein by reference in its entirety.

Figure 8:
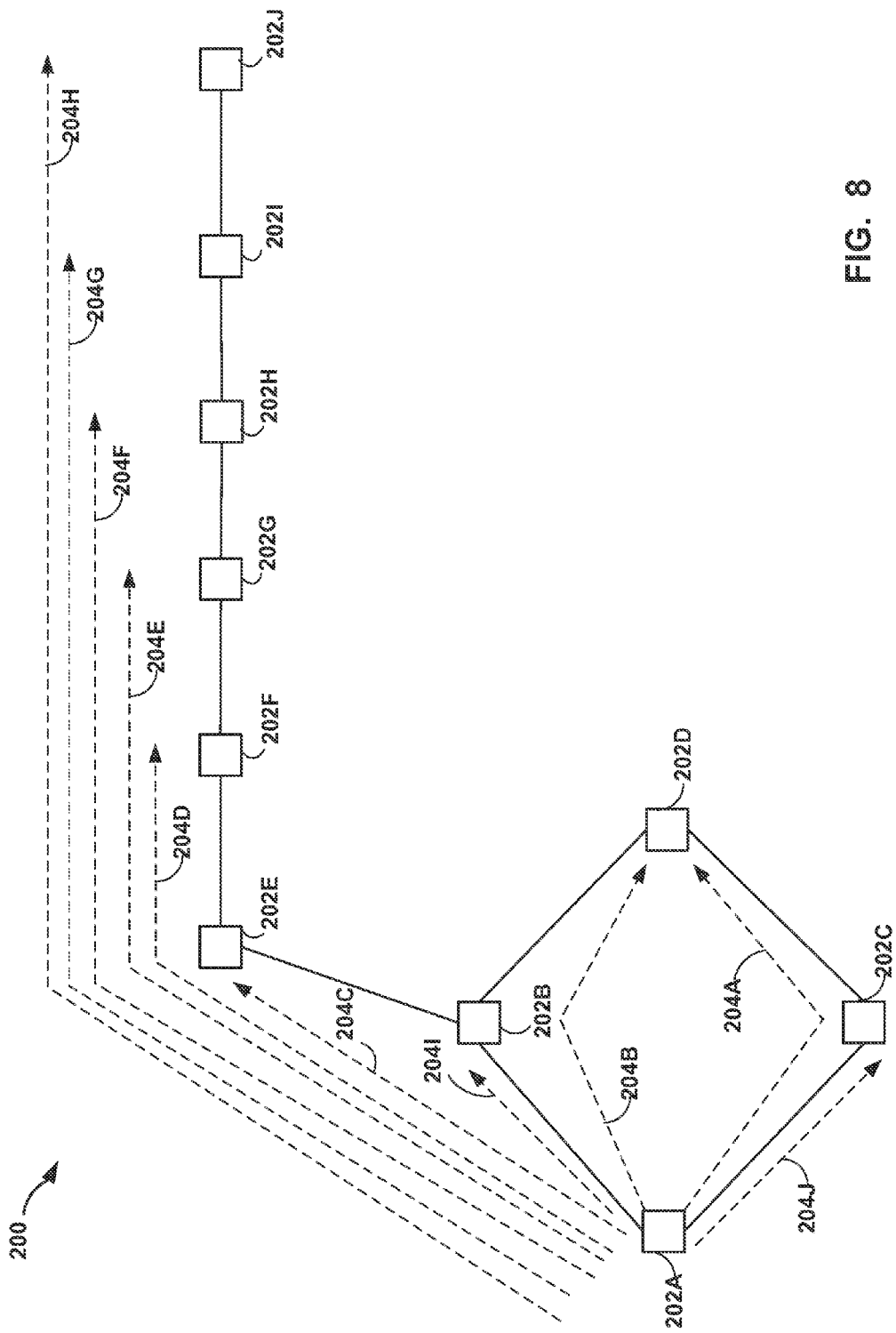
FIG. 8 is a block diagram illustrating an example network system having routers that perform weighted ECMP techniques.

FIG. 8 is a block diagram illustrating an example network system 200 having routers 202A-202J ("routers 202") that perform weighted ECMP techniques. Routers 202 may operate in a manner similar to that described with respect to router 28 of FIG. 2, routers 10 of FIG. 1, or routers 82 of FIG. 7. If, as in system 200, there are multiple paths sharing same the same outgoing interface (OIF), router 202A should determine all the bandwidth units per next-hop, such that router 202A can assign weights to the outgoing interfaces accordingly.

In the example of FIG. 8, router 202A is the root of the SPF. Assume that all IGP metrics of the links between routers 202 have a value of 1. Assume that all of the links between routers 202 have an advertised minimum available bandwidth of 10 Gigabits per second. In this example, the next-hop interface to router 202B is carrying 8 paths at 10 Gb bandwidth each (i.e., paths 204B, 204C, 204D, 204E, 204F, 204G, 205H, and 204I), and the next-hop interface to router 202C is carrying 2 paths at 10 Gb bandwidth each (i.e., paths 204A and 204J). Router 202A thus computes the weights for the ECMP routes from router 202A to router 202D as: next-hop interface to router 202B having a weight of 2, next hop interface to router 202C having a weight of 8.

Figure 9:
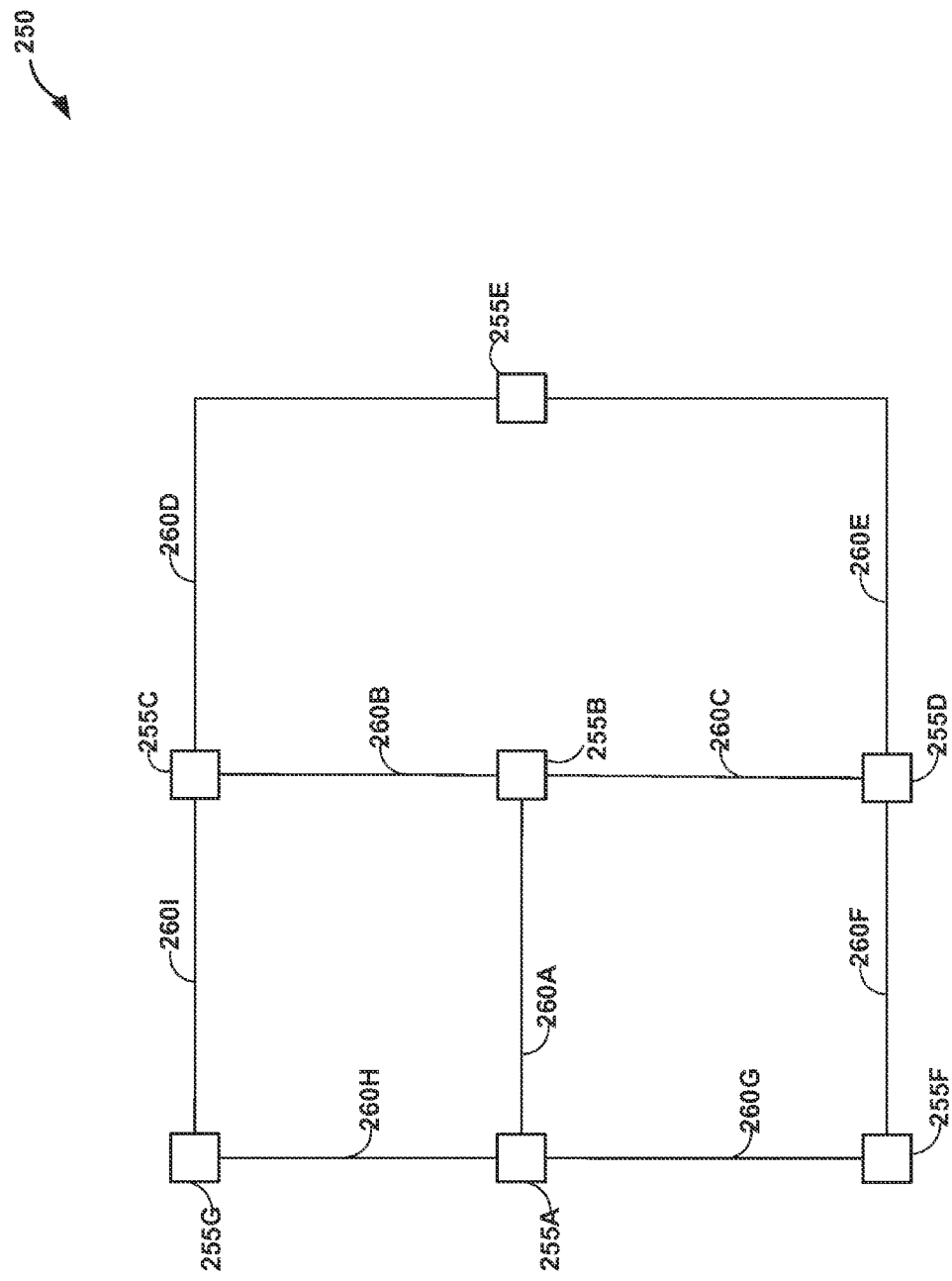
FIG. 9 is a block diagram illustrating an example network system having routers that perform weighted ECMP techniques.

FIG. 9 is a block diagram illustrating an example network system 250 having routers 255A-255G ("routers 255") that perform weighted ECMP techniques. Routers 255 may operate in a manner similar to that described with respect to router 28 of FIG. 2, routers 10 of FIG. 1, routers 82 of FIG. 7, routers 202 of FIG. 8, and routers 302 of FIG. 10.

In the example of FIG. 9, assume that link 260A has an advertised available bandwidth of 1 Gigabit per second, assume that links 260H, 260I, 260B, and 260D each have an advertised available bandwidth of 5 Gigabits per second, and assume that links 260C, 260E, 260F and 260G each have an advertised available bandwidth of 6 Gigabits per second. Router 255A's interface toward router 255G is denoted "g," router 255A's interface toward router 255B is denoted "b," and router 255A's interface toward router 255F is denoted "f." All link metrics have a value of 1.

Router 255A computes a SPF or CSPF algorithm over its routing information and/or TED After the first 3 steps of the SPF algorithm, router 255A has:

PATHS: [255G, g(5), 1], [255B, b(1), 1], [255F, f(6), 1]
TENT: [255C, g(5), 2], [255C, b(1), 2], [255D, b(1), 2], [255D, f(6), 2].
Then router 255 adds:
PATHS: [255C, g(5)/b(1), 2]
TENT: [255E, g(5)/b(1), 3].
Then router 255 adds:
PATHS: [255D, b(1)/f(6), 2]
TENT: [255E, b(1)/f(6), 3].
Then:
PATH: [255E, g(5)/b(1)/f(6), 3].

Path weight calculator 44 of router 255A computes the weight of the outgoing interfaces for load balancing traffic on equal-cost paths toward router 255E as follows: the weight of the outgoing interface for next hop 255G is 5, the weight of the outgoing interface for next hop 255B is 1, and the weight of the outgoing interface for next hop 255F is 6. Thus, it can be seen that if there are multiple paths to a destination with the same metric c, path weight calculator 44 computes the weight of each of the different next-hop interfaces as the minimum bandwidth across each path. In this example, router 255A's forwarding table (e.g., as stored in forwarding information 70 (FIG. 2)) becomes as shown in TABLE 1:

TABLE 1

| Destination | Interface | Weight |
|---|---|---|
| 255G | g | 1 |
| 255B | b | 1 |
| 255F | f | 1 |
| 255C | g | 5/6 |
| 255C | b | 1/6 |
| 255D | b | 1/7 |
| 255D | f | 6/7 |
| 255E | g | 5/12 |
| 255E | b | 1/12 |
| 255E | f | 6/12 |

Figure 10:
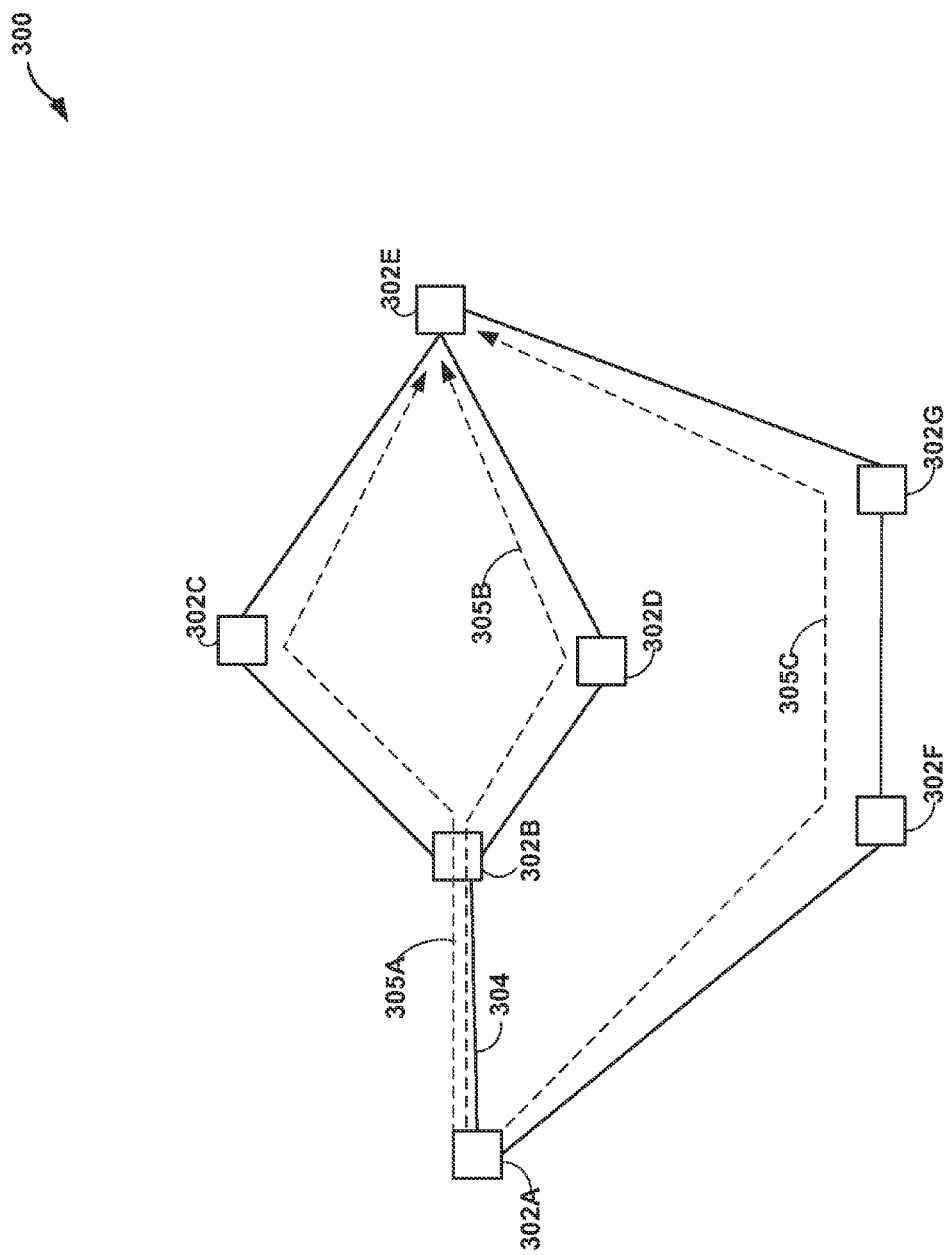
FIG. 10 is a block diagram illustrating an example network system having routers that perform weighted ECMP techniques.

FIG. 10 is a block diagram illustrating an example network system 300 having routers 302A-302G ("routers 302") that perform weighted ECMP techniques. Routers 302 may operate in a manner similar to that described with respect to router 28 of FIG. 2, routers 10 of FIG. 1, routers 82 of FIG. 7, routers 202 of FIG. 8, and routers 255 of FIG. 9.

In the illustrated example, router 302A computes a SPF or CSPF algorithm over its routing information and/or TED that results in multiple shortest paths 305A, 305B, and 305C ("paths 305") between source router 302A and destination router 302E having equal costs. Paths 305 may each represent one or more LSPs or IP paths, for example.

In the example of FIG. 10, each path 305 has its own overall path bandwidth, but paths from different next-hop routers can overlap and need to share links downstream of router 302A. For example, path 305B overlaps with path 305A and shares link 304 with these paths. Routers closer to the destination may see only a subset of the paths sharing a constraining link that the computing router sees. For example, router 302C may see only a path 305A, while source router 302A sees paths 305B, 305A, and 305C on link 304.

Routers 302 may be part of a network (not shown) that may comprise a public network, such as the Internet, a private network, such as those owned and operated by an enterprise or service provider, or a combination of both public and private networks. The network may include one or more Wide Area Networks (WANs), Local Area Networks (LANs), Virtual Local Area Networks (VLANs), Virtual Private Networks (VPNs), and/or another type of network. In some instances, the network may be an Internet Protocol (IP) network in which routers 302 use IP forwarding for transporting network packets received from source router 302A. In other examples, the network may be an MPLS network in which routers 302 may use MPLS signaling protocols such as LDP or RSVP to establish LSPs for transporting the network packets. In some examples, the network may include RSVP multipath traffic in which sub-LSPs are signaled without bandwidth reservation. Further details of RSVP multi-path using sub-LSPs are described in K. Kompella, "Multi-path Label Switched Paths Signaled Using RSVP-TE," Network Working Group, Internet-Draft, Oct. 31, 2011; and U.S. patent application Ser. No. 12/507,200, entitled "Load Balancing Network Traffic on a Label Switched Path Using Resource Reservation Protocol with Traffic Engineering," filed Jul. 22, 2009; the entire contents of each of which are incorporated herein by reference.

In addition, system 300 may include a variety of other network devices for forwarding network traffic, such as additional routers, switches, or bridges. The particular configuration of network system 300 is merely an example, and routers 302 may reside in a single network or within multiple networks. Routers 302 may be implemented as router 28 of FIG. 2, for example, and components of router 28 may operate according to the techniques set forth herein with respect to FIG. 6. Although described for purposes of example with respect to routers, aspects of the techniques described herein are applicable to, and may be implemented by, other network devices, such as bridges, switches, gateways, network caches, and network acceleration devices.

In the example of FIG. 10, routers 302 are interconnected by links (e.g., link 304). The term "communication link," as used herein, comprises any form of transport medium, wired or wireless, and can include intermediate nodes such as network devices. Each of the access links may comprise, for instance, aspects of an asymmetric DSL network, WiMAX, a T-1 line, an Integrated Service Digital Network (ISDN), or wired Ethernet.

Links 304 may comprise a number of physical and virtual communication links that interconnect routers 302 to facilitate control and data communication between the routers. Physical links may include, for example, Ethernet PHY, Synchronous Optical Networking (SONET)/Synchronous Digital Hierarchy (SDH), Lambda, or other Layer 2 data links that include packet transport capability. Logical links may include, for example, an Ethernet Virtual LAN, an MPLS LSP, or an MPLS-TE LSP.

Routers 302 may employ one or more interior gateway protocols (IGPs) to learn link states/metrics for communication links within the interior of system 300. For example, routers 302 may use an Open Shortest Path First (OSPF) or Intermediate System-Intermediate System (IS-IS) protocol to exchange routing information. Router 302A stores the routing information to a routing information base that the router uses to compute optimal routes to destination addresses advertised within system 300. Routers 302 execute the interior gateway protocols to communicate via routing protocol messages and exchange metrics established for the links and store these metrics in a respective routing information base for use in computing optimal routes to destination addresses advertised within a network.

In some instances, routers 302 support traffic engineering to improve the utilization of paths through system 300. In general, traffic engineering refers to operations to move traffic flow away from the shortest path computed by an interior gateway protocol and toward a potentially less congested or otherwise more desirable (from an operational point of view) physical path across the network. For example, routers 302 or a network administrator may establish, using Resource Reservation Protocol with Traffic Engineering extensions (RSVP-TE) or another label distribution protocol (e.g., the Label Distribution Protocol (LDP)), one or more LSP tunnels that connect various pairs of routers 302 to route network traffic away from network failures, congestion, and bottlenecks. A router that comprises an interface to the LSP tunnel associates a metric with the LSP. An LSP metric may assume the metric of the underlying IP path over which the LSP operates or may be configured by a network administrator to a different value to influence routing decisions by routers 302.

Routers 302 execute the interior gateway protocols to communicate via routing protocol messages and exchange metrics established for the LSP tunnels and store these metrics in a respective routing information base for use in computing optimal routes to destination addresses advertised within network 206. For example, routers 302 may advertise LSP tunnels as IGP links using OSPF forwarding adjacencies (FAs).

As described herein, routers 302 may additionally distribute detailed knowledge about network loading using extensions to the IGPs. For example, routers 302 may execute IS-IS with traffic engineering extensions described herein that use new type-length values (TLVs), such as TLV 140 described with respect to FIG. 5. As another example, routers 302 may execute OSPF with traffic engineering extensions using opaque link-state advertisements (LSAs) to distribute link attributes in link-state advertisements in addition to link-state and metrics.

In accordance with the techniques of this disclosure, source router 302A runs a WECMP algorithm to identify the equal-cost forwarding paths between source router 302A and destination router 305E, compute an amount of bandwidth to send on outgoing interfaces to next-hops associated with the equal-cost forwarding paths, and load-balance traffic proportionally to each next-hop based upon the computed amount of bandwidth represented by that next-hop. For example, source router 302A computes an initial amount of bandwidth based upon the minimum bandwidth associated with each link along the path. In doing this, the computing router (e.g., source router 302A) also considers shared links on paths, such as link 304.

Upon determining that one of the network links is shared by multiple of the plurality of equal-cost forwarding paths, source router 302A computes an amount of bandwidth for each outgoing interface in a manner that accounts for splitting of link bandwidth of the shared network link across the multiple equal-cost forwarding paths that share the network link. For example, a node that computes equal-cost paths that share a common segment along their paths must account to the minimum bandwidth of the combined paths accordingly, thus ensuring the common segment is not overloaded.

For example, assume all links have an ISIS metric of 1 and a bandwidth of 1. At the last step of Dijkstra, router 302A has the following:

TENT=[302E, f(1), 3], [302E, b(1),3], [302E, b(1),3],
And hence [302E, f(1)/b(1), 3] is added into PATH.

In this example, would have been a mistake for router 302A to sum the bandwidth of the two paths via the outgoing interface to router 302B, because the sum of the two paths 305A, 305B is constrained by the bandwidth of the common link 304. In this example, the common link 304 is directly connected to the computing router 302A. In the generic case, the shared link could be multiple hops away. The computing router can learn about the common link based on IGP-TE advertisements.

Although described for purposes of example in terms of router 302A doing the computing, the computing may be performed on a hop-by-hop basis by each of routers 302 using the techniques of this disclosure. Routers 302 may set up paths in an MPLS-TE environment, or a non-MPLS environment. In this manner, explicit end-to-end signaling of paths 305 is not required to use the techniques of this disclosure, although an end-to-end LSP may be used (e.g., RSVP-TE LSPs established by router 302A along paths 305).

Various examples have been described. These and other examples are within the scope of the following claims.

The invention claimed is:

1. A method comprising:
   receiving, with a first router of a network, a link bandwidth for each of one or more network links of the network that are positioned between the first router and a second router of the network;
   identifying, with the first router, a plurality of equal-cost forwarding paths from the first router of the network to the second router of the network;
   determining that one of the network links is a common network link shared by multiple of the plurality of equal-cost forwarding paths;
   in response to determining that the one of the network links is a common network link shared by multiple of the plurality of equal-cost forwarding paths, computing an amount of bandwidth that can be sent on each of a plurality of outgoing interfaces of the first router for the plurality of equal-cost forwarding paths, wherein computing the amount of bandwidth comprises computing the amount of bandwidth to account for splitting of link bandwidth of the common network link across the multiple equal-cost forwarding paths that share the common network link;
   selectively assigning, with the first router, packet flows to each of the plurality of outgoing interfaces based at least on the computed amount of bandwidth;
   receiving packets for the packet flows with the first router; and
   forwarding packets of each of the packets flows to the respective one of the plurality of outgoing interfaces to which the packet flow is assigned.

2. The method of claim 1, further comprising:
   determining, with the first router, a weight for each of the plurality of outgoing interfaces that is proportional to the computed amount of bandwidth for each of the plurality of outgoing interfaces; and
   selectively assigning, with the first router, packet flows to each of the plurality of outgoing interfaces based at least on the weight for each of the outgoing interfaces.

3. The method of claim 1, wherein receiving the link bandwidth comprises receiving link bandwidth for each of a plurality of parallel network links between two adjacent nodes of the network, wherein each of the plurality of parallel network links between the two adjacent nodes has a same minimum cost between the two adjacent nodes, and wherein the plurality of parallel network links are considered by the first router as a single path, the method further comprising:

with the first router, summing the link bandwidth for each of the plurality of parallel network links between the two adjacent nodes to determine a link bandwidth associated with the parallel links.

4. The method of claim 1, wherein computing the amount of bandwidth for each of the equal-cost forwarding paths comprises determining a minimum link bandwidth among a subset of the one or more network links that constitutes one of the plurality of equal-cost forwarding paths, and computing the minimum link bandwidth as a path bandwidth associated with the one of the plurality of equal-cost forwarding paths.

5. The method of claim 1, wherein the shared network link is positioned between the first router and the second router, and wherein the shared network link is directly coupled to the first router.

6. The method of claim 1,
wherein the packet flows include a first packet flow and a second packet flow,
wherein each of the packets for the first packet flow and the second packet flow includes an Internet Protocol (IP) header,
wherein the first router selectively assigns the first packet flow to the outgoing interface based at least on the computed amount of bandwidth for the outgoing interface, and
wherein the first router selectively assigns the second packet flow to a second outgoing interface of the first router based at least on a computed amount of bandwidth for the second outgoing interface.

7. The method of claim 1,
wherein the packet flows include a first packet flow and a second packet flow,
wherein each of the packets for the first packet flow and the second packet flow includes a label for a single Resource Reservation Protocol with Traffic Engineering extensions (RSVP-TE) signaled label switched path (LSP),
wherein the first router selectively assigns the first packet flow to a first one of the plurality of forwarding paths based at least on a computed path bandwidth for the first one of the plurality of forwarding paths, and
wherein the first router selectively assigns the second packet flow to a second one of the plurality of forwarding paths based at least on a computed path bandwidth for the second one of the plurality of forwarding paths.

8. The method of claim 1, further comprising:
generating an equal-cost multipath (ECMP) set comprising the plurality of equal-cost forwarding paths by computing a shortest path first tree for routers of the network with the first router as the root of the shortest path first tree, wherein each of the plurality of equal-cost forwarding paths is a shortest path of the shortest path first tree to the second router.

9. The method of claim 8,
generating, with the first router, respective next-hops for each of the plurality of equal-cost forwarding paths in the ECMP set;
installing, with the first router, the next-hops to forwarding information of the first router;
determining, with the first router, a weight for each of the plurality of equal-cost forwarding paths in the ECMP set that is based at least on the computed amount of bandwidth for each of the plurality of equal-cost forwarding paths in the ECMP set;
associating, with the first router, the weight for each of the plurality of equal-cost forwarding paths in the ECMP set with the next-hop for the forwarding path; and
selectively assigning, with the first router, packet flows to next-hops based at least on the weights associated with the next-hops.

10. The method of claim 1, wherein receiving the link bandwidth comprises receiving a maximum link bandwidth for each of the one or more network links, wherein the maximum link bandwidth defines a maximum amount of bandwidth capacity associated with a network link.

11. The method of claim 1, wherein receiving the link bandwidth comprises receiving a residual bandwidth for each of the one or more network links, wherein the residual bandwidth defines an amount of bandwidth capacity for a network link that is a maximum link bandwidth less a bandwidth of the network link reserved by operation of a resource reservation protocol.

12. The method of claim 1, wherein receiving the link bandwidth comprises receiving an available bandwidth for each of the one or more network links, wherein the available bandwidth defines an amount of bandwidth capacity for the network link that is neither reserved by operation of a resource reservation protocol nor currently being used by the first router to forward traffic using unreserved resources.

13. The method of claim 1, wherein forwarding the packets comprises forwarding Internet Protocol (IP) packets having IP headers.

14. The method of claim 1, wherein the network links comprise Label Distribution Protocol (LDP) label switched paths (LSPs), wherein forwarding the packets comprises forwarding packets having LDP labels.

15. The method of claim 1, wherein the forwarding paths comprise Resource Reservation Protocol with Traffic Engineering extensions (RSVP-TE) label switched paths (LSPs), wherein forwarding the packets comprises forwarding packets having RSVP-TE labels, and wherein the first router comprises an ingress router of the RSVP-TE LSPs.

16. The method of claim 15, wherein at least one of the RSVP-TE LSPs is a multi-path LSP having sub-LSPs signaled without bandwidth reservation.

17. A network device comprising:
a control unit comprising one or more processors;
a routing protocol software of the control unit to receive a link bandwidth for each of one or more network links of a network that are positioned between the network device and a second network device of the network,
wherein the routing protocol software is to execute a routing protocol to identify a plurality of equal-cost forwarding paths from the first router of the network to the second router of the network;
a path weight calculator of the control unit to, determine that one of the network links is a common network link shared by multiple of the plurality of equal-cost forwarding paths, and, in response to determining that the one of the network links is a common network link shared by multiple of the plurality of equal-cost forwarding paths, compute an amount of bandwidth that can be sent on each of a plurality of outgoing interfaces of the first router for the plurality of equal-cost forwarding paths, wherein computing the amount of bandwidth comprises computing the amount of bandwidth to account for splitting of link bandwidth of the common network link across the multiple equal-cost forwarding paths that share the common network link;
a multipath forwarding component of the control unit to selectively assign packet flows to each of the plurality of outgoing interfaces of the network device based at least on the computed amount of bandwidth; and one or more interface cards to receive packets for the packet flows, wherein the multipath forwarding component forwards packets of each of the packets flows to the respective one of the plurality of outgoing interfaces to which the packet flow is assigned.

18. The network device of claim 17,
wherein the routing protocol software receives link bandwidth for each of a plurality of parallel network links between two adjacent nodes of the network, wherein each of the plurality of parallel network links between the two adjacent nodes has a same minimum cost between the two adjacent nodes, and wherein the plurality of parallel network links are considered by the first router as a single path,
wherein the path weight calculator sums the link bandwidth for each of the plurality of parallel network links between the two adjacent nodes to determine a link bandwidth associated with the parallel links.

19. The network device of claim 17, wherein the path weight calculator determines a minimum link bandwidth among a subset of the one or more network links that constitutes one of the plurality of equal-cost forwarding paths, and wherein the path weight calculator computes the minimum link bandwidth as a path bandwidth associated with the one of the plurality of equal-cost forwarding paths.

20. The network device of claim 17, wherein the shared network link is positioned between the network device and the second router, and wherein the shared network link is directly coupled to the network device.

21. The network device of claim 17, wherein the path weight calculator is adapted to determine a weight for each of the plurality of equal-cost forwarding paths that is based at least on the computed amount of bandwidth for each of the plurality of outgoing interfaces, and selectively assign packet flows to each of the plurality of outgoing interfaces based at least on the weight for each of the plurality of outgoing interfaces.

22. The network device of claim 18, wherein the routing protocol software is adapted to generate an equal-cost multipath (ECMP) set comprising the plurality of equal-cost forwarding paths by computing a shortest path first tree for routers of the network with the network device as the root of the shortest path first tree, wherein each of the plurality of equal-cost forwarding paths is a shortest path of the shortest path first tree to the second router.

23. The network device of claim 22, further comprising:
forwarding information; and
a flow table that includes a respective packet flow entry for each of the packet flows,
wherein the path weight calculator determines a weight for each of the plurality of equal-cost forwarding paths in the ECMP set that is based at least on the computed amount of bandwidth for each of the plurality of equal-cost forwarding paths in the ECMP set,
wherein the routing protocol software generates respective next-hops structures for each of the plurality of equal-cost forwarding paths in the ECMP set and installs the next-hop structures to the forwarding information,
wherein the multipath forwarding component associates the weight for each of the plurality of equal-cost forwarding paths in the ECMP set with the next-hop structure for the forwarding path, and wherein the multipath forwarding component selectively assigns packet flows to next-hop structures based at least on the weights associated with the next-hop structures and, for each packet flow, sets within the respective packet flow entry for the packet flow a reference to the assigned next-hop structure for the packet flow in the forwarding information.

24. The network device of claim 17, wherein the link bandwidth comprises one of:
a maximum link bandwidth for each of the one or more network links, wherein the maximum link bandwidth defines a maximum amount of bandwidth capacity associated with a network link;
a residual bandwidth for each of the one or more network links, wherein the residual bandwidth defines an amount of bandwidth capacity for a network link that is a maximum link bandwidth less a bandwidth of the network link reserved by operation of a resource reservation protocol; and
an available bandwidth for each of the one or more network links, wherein the available bandwidth defines an amount of bandwidth capacity for the network link that is neither reserved by operation of a resource reservation protocol nor currently being used by the first router to forward traffic using unreserved resources.

25. A computer-readable storage medium comprising instructions for causing a programmable processor to:
receive a link bandwidth for each of one or more network links of the network that are positioned between the first router and a second router of the network;
identify a plurality of equal-cost forwarding paths from the first router of the network to the second router of the network;
determine that one of the network links is a common network link shared by multiple of the plurality of equal-cost forwarding paths;
in response to determining the that one of the network links is a common network link shared by multiple of the plurality of equal-cost forwarding paths, compute an amount of bandwidth that can be sent on each of a plurality of outgoing interfaces of the first router for the plurality of equal-cost forwarding paths, wherein computing the amount of bandwidth comprises computing the amount of bandwidth to account for splitting of link bandwidth of the common network link across the multiple equal-cost forwarding paths that share the common network link;
selectively assign packet flows to each of the plurality of outgoing interfaces based at least on the computed amount of bandwidth;
receive packets for the packet flows with the first router; and
forward packets of each of the packets flows to the respective one of the plurality of outgoing interfaces to which the packet flow is assigned.

26. The method of claim 1, wherein the common network link is positioned between the first router and the second router at least one hop away from the first router and along each of the multiple of the plurality of equal-cost forwarding paths.

* * * * *